US012658781B2

(12) United States Patent
Choi et al.

(10) Patent No.: US 12,658,781 B2
(45) Date of Patent: Jun. 16, 2026

(54) 3-LEVEL CONVERTER WITH FLYING CAPACITOR VOLTAGE BALANCING CIRCUIT

(71) Applicants:Silicon Mitus, Inc., Seongnam-si (KR); SILICON-MAGIC SEMICONDUCTOR TECHNOLOGY (HANGZHOU) CO., LTD., Hangzhou City (CN)

(72) Inventors: Jae Soon Choi, Seoul (KR); Hak Hee Lee, Yongin-Si (KR); Seok Mun Choi, Seoul (KR)

(73) Assignees: Silicon Mitus, Inc., Seongnam-Si (KR); SILICON-MAGIC SEMICONDUCTOR TECHNOLOGY (HANGZHOU) CO., LTD., Hangzhou City (CN)

( * ) Notice: Subject to any disclaimer, the term of this patent is extended or adjusted under 35 U.S.C. 154(b) by 319 days.

(21) Appl. No.: 18/309,605

(22) Filed: Apr. 28, 2023

(65) Prior Publication Data

US 2023/0396168 A1    Dec. 7, 2023

(30) Foreign Application Priority Data

Jun. 7, 2022    (KR) ........................ 10-2022-0069092

(51) Int. Cl.
| | |
|---|---|
| *H02M 1/00* | (2007.01) |
| *H02M 3/07* | (2006.01) |
| *H02M 3/158* | (2006.01) |
| *H02M 7/483* | (2007.01) |
| *H02M 7/487* | (2007.01) |

(52) U.S. Cl.
CPC ........... *H02M 1/0095* (2021.05); *H02M 3/07* (2013.01); *H02M 3/158* (2013.01); *H02M 7/4833* (2021.05); *H02M 7/4837* (2021.05); *H02M 7/487* (2013.01)

(58) Field of Classification Search
CPC ...... H02M 1/0095; H02M 3/07; H02M 3/158; H02M 7/4833; H02M 7/4837; H02M 7/487
See application file for complete search history.

(56) References Cited

U.S. PATENT DOCUMENTS

| | | | | |
|---|---|---|---|---|
| 2014/0293667 A1* | 10/2014 | Schroeder | ........... | H02M 7/4833 363/60 |
| 2023/0283198 A1* | 9/2023 | Kong | ...................... | H02M 7/25 363/123 |

* cited by examiner

*Primary Examiner* — Jue Zhang
(74) *Attorney, Agent, or Firm* — Osha Bergman Watanabe & Burton LLP

(57)    ABSTRACT

A 3-level converter includes: an inductor connected in series between a switching node and an output terminal from which an output voltage is output, an output capacitor connected between the output terminal and a ground terminal, a first switch connected between an input terminal to which an input voltage is input and a top plate node, a second switch connected between the top plate node and the switching node, a third switch connected between the switching node and a bottom plate node, a fourth switch connected between the bottom plate node and a ground terminal, a flying capacitor connected between the top plate node and the bottom plate node, balancing switches connected between the switching node and a balancing node, a top balancing capacitor connected between the input terminal and the balancing node, and a bottom balancing capacitor connected between the balancing node and a ground terminal.

7 Claims, 20 Drawing Sheets

3-LEVEL CONVERTER WITH FLYING CAPACITOR VOLTAGE BALANCING CIRCUIT

CROSS-REFERENCE TO RELATED APPLICATION

This application claims priority to Korean Patent Application No. 10-2022-0069092 filed on Jun. 7, 2022 and all the benefits accruing therefrom under U.S.C. § 119, the contents of which are incorporated by reference in their entirety.

BACKGROUND

The present disclosure relates to a 3-level converter with a flying capacitor voltage balancing circuit. More specifically, the present disclosure relates to a 3-level converter with a flying capacitor voltage balancing circuit capable of improving efficiency by allowing voltages across switches to be equally applied and reducing inductor current ripple by implementing flying capacitor voltage balancing with a simple circuit in the 3-level converter, and capable of achieving the flying capacitor voltage balancing at high speed.

In general, compared to a 2-level buck converter or a 2-level boost converter, a 3-level buck converter or 3-level boost converter can use a switch having a lower withstand voltage and can reduce current ripple even when an inductor having a low inductance value is used, such that efficiency of the converter can be improved.

However, in the 3-level buck converter or the 3-level boost converter, when the flying capacitor voltage is unbalanced, the voltage stress on the switches increases and additional losses occur. Therefore, in order to maintain the advantages of the 3-level buck converter or the 3-level boost converter, it is important to maintain flying capacitor voltage balancing, but the prior art known to date does not provide an effective countermeasure for this.

SUMMARY

The present disclosure provides a 3-level converter capable of improving efficiency by allowing voltages across switches to be equally applied and reducing inductor current ripple by implementing flying capacitor voltage balancing with a simple circuit in the 3-level converter.

The present disclosure provides a 3-level converter capable of achieving the flying capacitor voltage balancing at high speed.

In accordance with one or more embodiments of the present disclosure, a 3-level converter with a flying capacitor voltage balancing circuit includes an inductor connected in series between a switching node and an output terminal from which an output voltage is output, an output capacitor connected between the output terminal and a ground terminal, a first switch connected between an input terminal to which an input voltage is input and a top plate node, a second switch connected between the top plate node and the switching node, a third switch connected between the switching node and a bottom plate node, a fourth switch connected between the bottom plate node and a ground terminal, a flying capacitor connected between the top plate node and the bottom plate node, balancing switches connected between the switching node and a balancing node, a top balancing capacitor connected between the input terminal and the balancing node, and a bottom balancing capacitor connected between the balancing node and a ground terminal.

In the 3-level converter with the flying capacitor voltage balancing circuit in accordance with one or more embodiments of the present disclosure, the flying capacitor may be connected in parallel with the top balancing capacitor for at least a first period of time during operation of the 3-level converter and may be connected in parallel with the bottom balancing capacitor for at least a second period of time during operation of the 3-level converter.

In the 3-level converter with the flying capacitor voltage balancing circuit in accordance with one or more embodiments of the present disclosure, a voltage of the flying capacitor may have the same value as a voltage of the top balancing capacitor and a voltage of the bottom balancing capacitor.

In the 3-level converter with the flying capacitor voltage balancing circuit in accordance with one or more embodiments of the present disclosure, the voltage of the flying capacitor, the voltage of the top balancing capacitor, and the voltage of the bottom balancing capacitor may maintain a value obtained by dividing the input voltage by 2.

In the 3-level converter with the flying capacitor voltage balancing circuit in accordance with one or more embodiments of the present disclosure, when a duty ratio D is less than approximately 0.5, during a first time, the first switch, the third switch, and the balancing switches may be turned on, the second switch and the fourth switch may be turned off, and the flying capacitor and the top balancing capacitor may be connected in parallel. After the first time has elapsed, during a second time following the first time, the third switch and the fourth switch may be turned on, and the first switch, the second switch, and the balancing switches may be turned off. After the second time has elapsed, during a third time equal to the first time, the second switch, the fourth switch, and the balancing switches may be turned on, the first switch and the third switch may be turned off, and the flying capacitor and the bottom balancing capacitor may be connected in parallel. After the third time has elapsed, during a fourth time equal to the second time, the third switch and the fourth switch may be turned on, and the first switch, the second switch, and the balancing switches may be turned off.

In the 3-level converter with the flying capacitor voltage balancing circuit in accordance with one or more embodiments of the present disclosure, when a duty ratio D is approximately 0.5, during a fifth time, the first switch, the third switch, and the balancing switches may be turned on, the second switch and the fourth switch may be turned off, and the flying capacitor and the top balancing capacitor may be connected in parallel. After the fifth time has elapsed, during a sixth time equal to the fifth time, the second switch, the fourth switch, and the balancing switches may be turned on, the first switch and the third switch may be turned off, and the flying capacitor and the bottom balancing capacitor may be connected in parallel.

In the 3-level converter with the flying capacitor voltage balancing circuit in accordance with one or more embodiments of the present disclosure, when a duty ratio D is greater than approximately 0.5, during a seventh time, the first switch, the third switch, and the balancing switches may be turned on, the second switch and the fourth switch may be turned off, and the flying capacitor and the top balancing capacitor may be connected in parallel. After the seventh time has elapsed, during an eighth time following the seventh time, the first switch and the second switch may be turned on, and the third switch, the fourth switch, and the balancing switches may be turned off. After the eighth time has elapsed, during the ninth time equal to the seventh time, the second switch, the fourth switch, and the balancing switches may be turned on, the first switch and the third switch may be turned off, and the flying capacitor and the bottom balancing capacitor may be connected in parallel. After the ninth time has elapsed, during a tenth time equal to the eighth time, the first switch and the second switch may be turned on, and the third switch, the fourth switch, and the balancing switches may be turned off.

In accordance with one or more embodiments of the present disclosure, a 3-level converter with a flying capacitor voltage balancing circuit includes an inductor connected in series between a switching node and an input terminal to which an input voltage is input, a first switch connected between an output terminal from which an output voltage is output and a top plate node, an output capacitor connected between the output terminal and a ground terminal, a second switch connected between the top plate node and the switching node, a third switch connected between the switching node and a bottom plate node, a fourth switch connected between the bottom plate node and a ground terminal, a flying capacitor connected between the top plate node and the bottom plate node, balancing switches connected between the switching node and a balancing node, a top balancing capacitor connected between the output terminal and the balancing node, and a bottom balancing capacitor connected between the balancing node and a ground terminal.

In the 3-level converter with the flying capacitor voltage balancing circuit in accordance with one or more embodiments of the present disclosure, the flying capacitor may be connected in parallel with the top balancing capacitor for at least a first period of time during operation of the 3-level converter and may be connected in parallel with the bottom balancing capacitor for at least a second period of time during operation of the 3-level converter.

In the 3-level converter with the flying capacitor voltage balancing circuit in accordance with one or more embodiments of the present disclosure, a voltage of the flying capacitor may have a same value as a voltage of the top balancing capacitor and a voltage of the bottom balancing capacitor.

In the 3-level converter with the flying capacitor voltage balancing circuit in accordance with one or more embodiments of the present disclosure, the voltage of the flying capacitor, the voltage of the top balancing capacitor, and the voltage of the bottom balancing capacitor may maintain a value obtained by dividing the output voltage by 2.

In the 3-level converter with the flying capacitor voltage balancing circuit in accordance with one or more embodiments of the present disclosure, when a duty ratio D is less than approximately 0.5, during a first time, the first switch, the third switch, and the balancing switches may be turned on, the second switch and the fourth switch may be turned off, and the flying capacitor and the top balancing capacitor may be connected in parallel. After the first time has elapsed, during a second time following the first time, the first switch and the second switch may be turned on, and the third switch, the fourth switch, and the balancing switch may be turned off. After the second time has elapsed, during a third time equal to the first time, the second switch, the fourth switch, and the balancing switches may be turned on, the first switch and the third switch may be turned off, and the flying capacitor and the bottom balancing capacitor may be connected in parallel. After the third time has elapsed, during a fourth time equal to the second time, the first switch and the second switch may be turned on, and the third switch, the fourth switch, and the balancing switch may be turned off.

In the 3-level converter with the flying capacitor voltage balancing circuit in accordance with one or more embodiments of the present disclosure, when a duty ratio D is approximately 0.5, during a fifth time, the first switch, the third switch, and the balancing switches may be turned on, the second switch and the fourth switch may be turned off, and the flying capacitor and the top balancing capacitor may be connected in parallel. After the fifth time has elapsed, during a sixth time equal to the fifth time, the second switch, the fourth switch, and the balancing switches may be turned on, the first switch and the third switch may be turned off, and the flying capacitor and the bottom balancing capacitor may be connected in parallel.

In the 3-level converter with the flying capacitor voltage balancing circuit in accordance with one or more embodiments of the present disclosure, when a duty ratio D is greater than approximately 0.5, during a seventh time, the first switch, the third switch, and the balancing switches may be turned on, the second switch and the fourth switch may be turned off, and the flying capacitor and the top balancing capacitor may be connected in parallel. After the seventh time has elapsed, during an eighth time following the seventh time, the third switch and the fourth switch may be turned on, and the first switch, the second switch, and the balancing switch may be turned off. After the eighth time has elapsed, during the ninth time equal to the seventh time, the second switch, the fourth switch, and the balancing switches may be turned on, the first switch and the third switch may be turned off, and the flying capacitor and the bottom balancing capacitor may be connected in parallel. After the ninth time has elapsed, during a tenth time equal to the eighth time, the third switch and the fourth switch may be turned on, and the first switch, the second switch, and the balancing switch may be turned off.

BRIEF DESCRIPTION OF THE DRAWINGS

One or more embodiments can be understood in more detail from the following description taken in conjunction with the accompanying drawings, in which.

DETAILED DESCRIPTION

Figure 1:
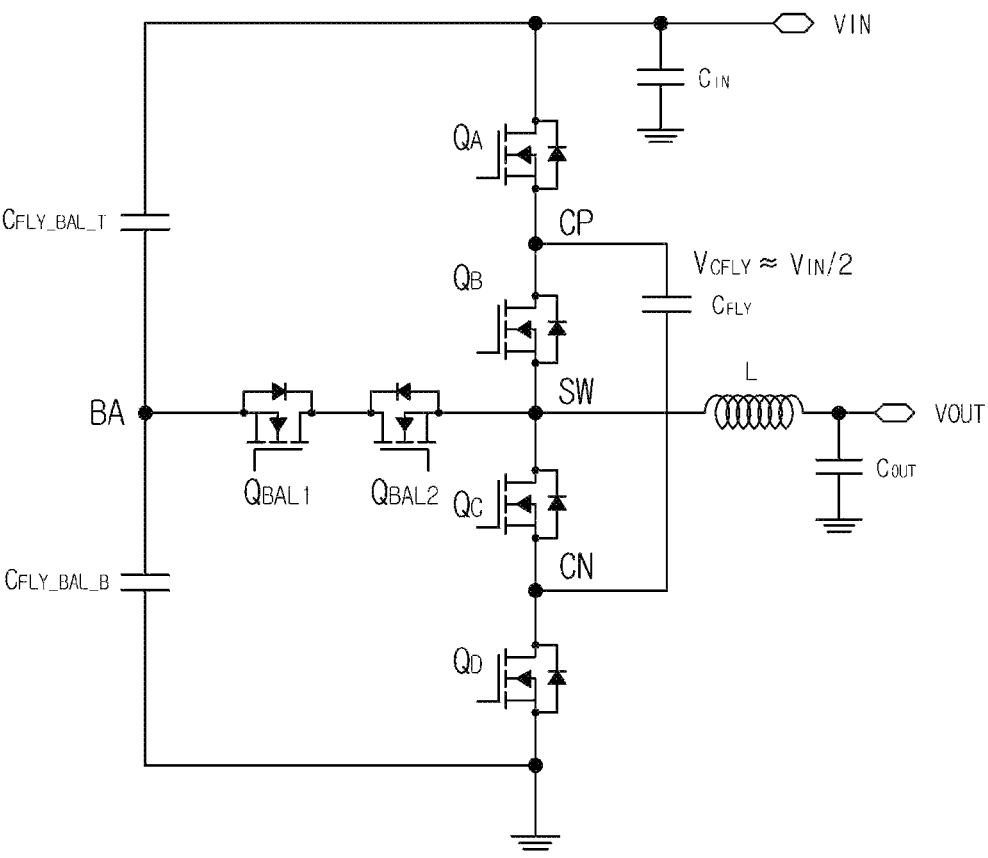
FIG. 1 is a diagram illustrating a 3-level converter in accordance with one or more embodiments of the present disclosure.

Specific structural or functional descriptions of embodiments according to the concept of the present disclosure disclosed in this specification are only illustrated for the purpose of explaining the embodiments according to the concept of the present disclosure, and the embodiments according to the concept of the present disclosure may be embodied in various forms and should not be construed as limited to the embodiments set forth herein. Rather, these embodiments are provided so that this disclosure will be thorough and complete, and will fully convey the scope of the present disclosure to those skilled in the art.

Various modifications may be made to the embodiments according to the concept of the present disclosure and the embodiments may have various forms, and thus the embodiments are illustrated in the drawings and described in detail in this specification. However, this is not intended to limit the embodiments according to the concept of the present disclosure to specific disclosure forms, and includes all modifications, equivalents, or substitutes included in the spirit and technical scope of the present disclosure.

Unless otherwise defined, all terms used herein, including technical or scientific terms, have the same meaning as commonly understood by one of ordinary skill in the art to which the present disclosure belongs. Terms such as those defined in commonly used dictionaries should be interpreted as having a meaning consistent with the meaning in the context of the prior art, and should not be interpreted in an ideal or excessively formal meaning unless explicitly defined in this specification.

Hereinafter, one or more embodiments of the present disclosure will be described in detail with reference to the accompanying drawings.

In the following description, it should be noted that one or more embodiments of the present disclosure provide a buck converter and one or more embodiments provide a boost converter.

FIG. 1 is a diagram illustrating a 3-level converter in accordance with one or more embodiments of the present disclosure.

Referring to FIG. 1, one or more embodiments of the present disclosure provide a 3-level buck converter including a flying capacitor voltage balancing circuit, and is configured to include an inductor L, a first switch $Q_A$, a second switch $Q_B$, a third switch $Q_C$, a fourth switch $Q_D$, a flying capacitor $C_{FLY}$, balancing switches $Q_{BAL1}$ and $Q_{BAL2}$, a top balancing capacitor $C_{FLY\_BAL\_T}$, and a bottom balancing capacitor $C_{FLY\_BAL\_B}$.

In the following description, the first switch $Q_A$, the second switch $Q_B$, the third switch $Q_C$, the fourth switch $Q_D$, and the balancing switches $Q_{BAL1}$ and $Q_{BAL2}$ may be field effect transistors, but are not limited thereto.

The inductor L is connected in series between the switching node SW and an output terminal VOUT from which an output voltage $V_{OUT}$ is output.

The output capacitor $C_{OUT}$ is connected between the output terminal VOUT and a ground terminal.

The first switch $Q_A$ is connected between an input terminal VIN to which an input voltage $V_{IN}$ is input and a top plate node CP.

The second switch $Q_B$ is connected between the top plate node CP and the switching node SW.

The third switch $Q_C$ is connected between the switching node SW and a bottom plate node CN.

The fourth switch $Q_D$ is connected between the bottom plate node CN and a ground terminal.

The flying capacitor $C_{FLY}$ is connected between the top plate node CP and the bottom plate node CN.

The balancing switches $Q_{BAL1}$ and $Q_{BAL2}$ are connected between the switching node SW and a balancing node BA.

The top balancing capacitor $C_{FLY\_BAL\_T}$ is connected between the input terminal VIN and the balancing node BA.

The bottom balancing capacitor $C_{FLY\_BAL\_B}$ is connected between the balancing node BA and a ground terminal.

For example, the flying capacitor $C_{FLY}$ may be configured to be connected in parallel with the top balancing capacitor $C_{FLY\_BAL\_T}$ for at least a first period of time during operation of the 3-level converter, and to be connected in parallel with the bottom balancing capacitor $C_{FLY\_BAL\_B}$ for at least a second period of time during operation of the 3-level converter.

For example, a configuration may be made such that a voltage $V_{CFLY}$ of the flying capacitor CFLY has the same value as a voltage of the top balancing capacitor $C_{FLY\_BAL\_T}$, and a voltage of the bottom balancing capacitor $C_{FLY\_BAL\_B}$.

For example, a configuration may be made such that the voltage $V_{CFLY}$ of the flying capacitor $C_{FLY}$, the voltage of the top balancing capacitor $C_{FLY\_BAL\_T}$, and the voltage of the bottom balancing capacitor $C_{FLY\_BAL\_B}$ maintains a value ($V_{IN}/2$) obtained by dividing the input voltage $V_{IN}$ by 2.

Hereinafter, a non-limiting specific and exemplary operation configuration of the 3-level converter in accordance with one or more embodiments of the present disclosure will be described.

For example, when the 3-level buck-boost converter in accordance with one or more embodiments of the present disclosure operates at a duty ratio D less than approximately 0.5, a configuration may be made such that 1) during a first time, the first switch $Q_A$, the third switch $Q_C$, and the balancing switches $Q_{BAL1}$ and $Q_{BAL2}$ are turned on, the second switch $Q_B$ and the fourth switch $Q_D$ are turned off, and thus the flying capacitor CFLY and the top balancing capacitor $C_{FLY\_BAL\_T}$ are connected in parallel; 2) after the first time has elapsed, during a second time following the first time, the third switch $Q_C$ and the fourth switch $Q_D$ are turned on, and the first switch $Q_A$, the second switch $Q_B$, and the balancing switches $Q_{BAL1}$ and $Q_{BAL2}$ are turned off; 3) after the second time has elapsed, during a third time equal to the first time, the second switch $Q_B$, the fourth switch $Q_D$, and the balancing switches $Q_{BAL1}$ and $Q_{BAL2}$ are turned on, the first switch $Q_A$ and the third switch $Q_C$ are turned off, and thus the flying capacitor CFLY and the bottom balancing capacitor $C_{FLY\_BAL\_B}$ are connected in parallel; and 4) after the third time has elapsed, during a fourth time equal to the second time, the third switch $Q_C$ and the fourth switch $Q_D$ are turned on, the first switch $Q_A$, the second switch $Q_B$, and the balancing switches $Q_{BAL1}$ and $Q_{BAL2}$ are turned off.

Such an exemplary configuration according to one or more embodiments will be described in more detail with further reference to FIGS. 2 to 4.

Figure 2:
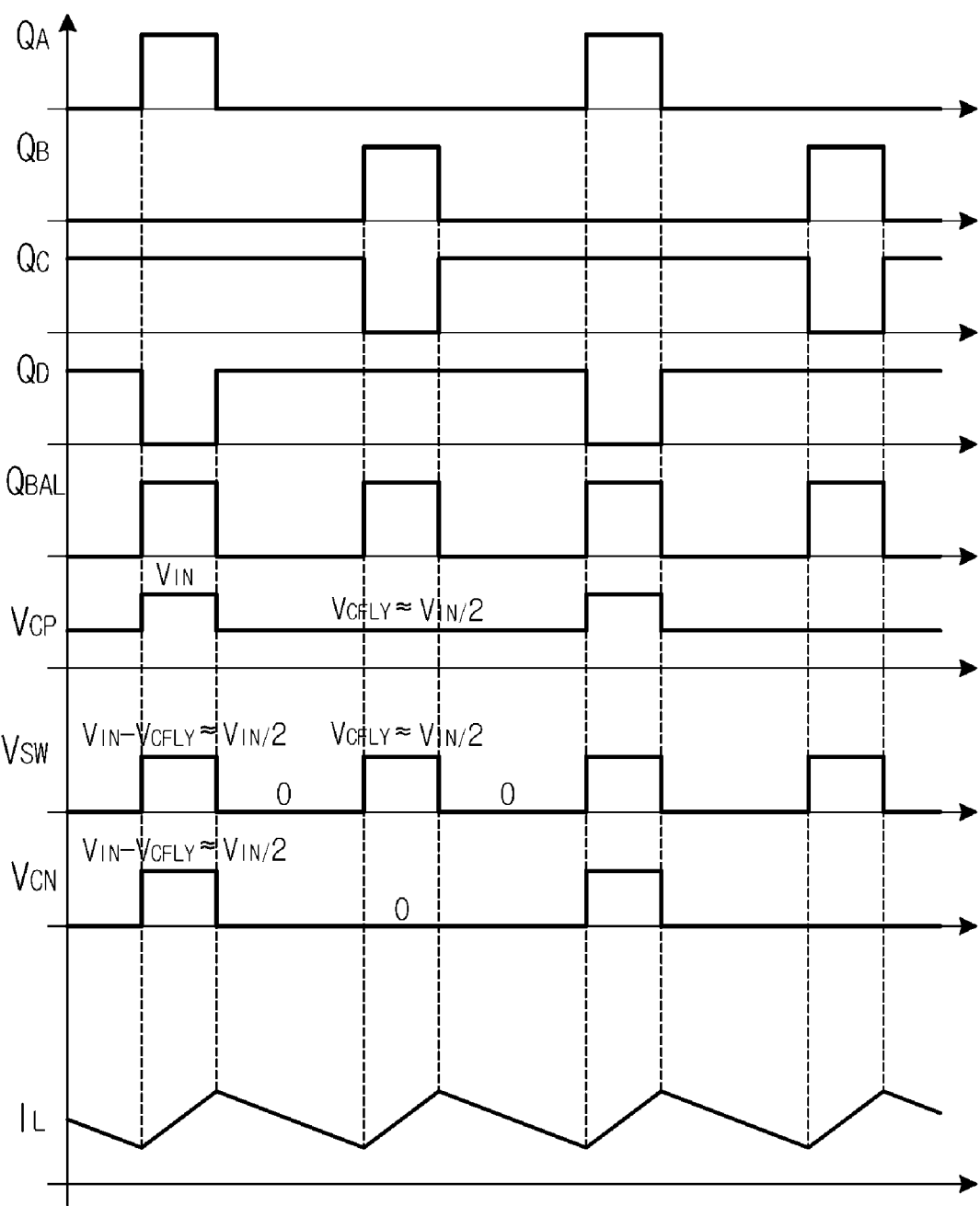
FIG. 2 is an exemplary operation timing diagram when a duty ratio D is less than approximately 0.5 in one or more embodiments of the present disclosure.
Figure 3:
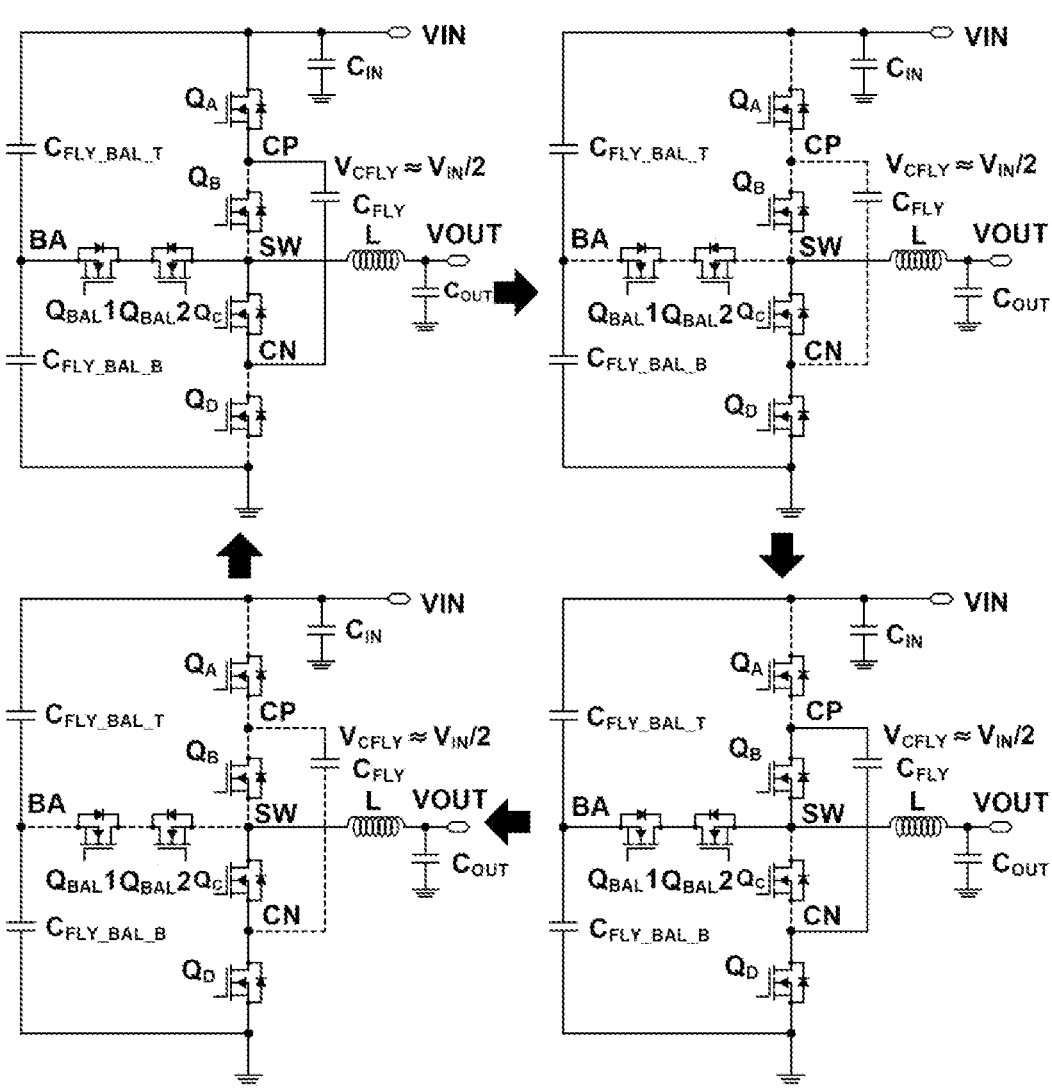
FIG. 3 is a diagram illustrating a circuit diagram of each operation mode when the duty ratio is less than approximately 0.5 in one or more embodiments of the present disclosure.
Figure 4:
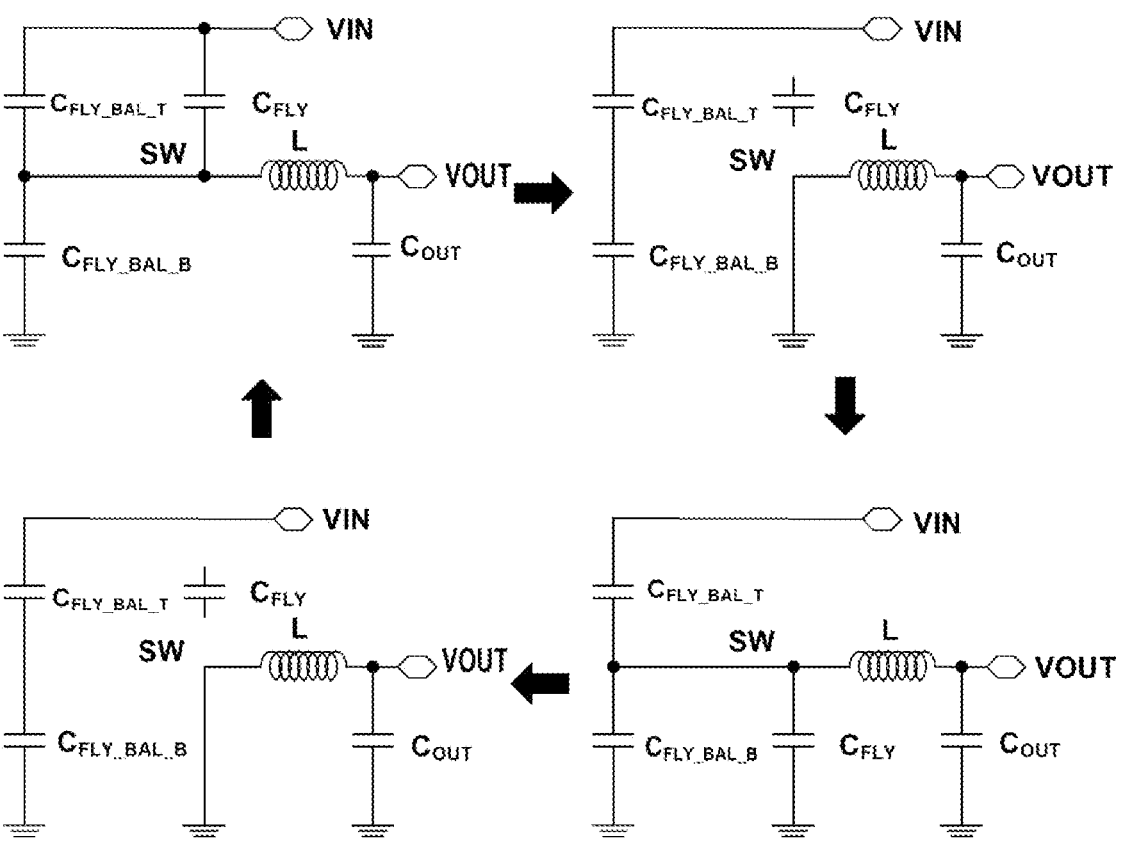
FIG. 4 is a diagram illustrating a simplified circuit diagram of each operation mode when the duty ratio is less than approximately 0.5 in one or more embodiments of the present disclosure.

FIG. 2 is an exemplary operation timing diagram when the duty ratio D is less than approximately 0.5 in one or more embodiments of the present disclosure, FIG. 3 is a diagram illustrating a circuit diagram of each operation mode when the duty ratio is less than approximately 0.5 in one or more embodiments of the present disclosure, and FIG. 4 is a diagram illustrating a simplified circuit diagram of each operation mode when the duty ratio is less than approximately 0.5 in one or more embodiments of the present disclosure.

Referring to FIGS. 2 to 4, first, during the first time, when the first switch $Q_A$, the third switch $Q_C$, and the balancing switches $Q_{BAL1}$, $Q_{BAL2}$ are turned on, the second switch $Q_B$ and the fourth switch $Q_D$ are turned off, and the flying capacitor CFLY and the top balancing capacitor $C_{FLY\_BAL\_T}$ are connected in parallel, a voltage $V_{CP}$ of the top plate node CP rises to an input voltage VIN, a voltage $V_{SW}$ of the switching node SW rises to a value ($V_{IN}-V_{CFLY}$) obtained by subtracting the voltage $V_{CFLY}$ of the flying capacitor $C_{FLY}$ from the input voltage $V_{IN}$, this value ($V_{IN}-V_{CFLY}$) is approximated to a value ($V_{IN}/2$) obtained by dividing the input voltage $V_{IN}$ by 2, and thus these values are substantially the same. In addition, the voltage $V_{CN}$ of the bottom plate node CN rises to the value ($V_{IN}-V_{CFLY}$) obtained by subtracting the voltage $V_{CFLY}$ of the flying capacitor $C_{FLY}$ from the input voltage $V_{IN}$, and this value ($V_{IN}-V_{CFLY}$) is approximated to the value ($V_{IN}/2$) obtained by dividing the input voltage $V_{IN}$ by 2; thus these values are substantially the same. In addition, a current $I_L$ of the inductor L gradually rises.

Next, after the first time has elapsed, during the second time following the first time, when the third switch $Q_C$ and the fourth switch $Q_D$ are turned on, and the first switch $Q_A$, the second switch $Q_B$, and the balancing switches $Q_{BAL1}$ and $Q_{BAL2}$ are turned off, the voltage $V_{CP}$ of the top plate node CP falls to voltage $V_{CFLY}$ of the flying capacitor $C_{FLY}$, and this value $V_{CFLY}$ is approximated to the value ($V_{IN}/2$) obtained by dividing the input voltage $V_{IN}$ by 2; thus these values become substantially equal. In addition, the voltage $V_{SW}$ of the switching node SW and the voltage $V_{CN}$ of the bottom plate node CN fall to the ground level 0, and the current $I_L$ of the inductor L gradually falls.

Next, after the second time has elapsed, during the third time equal to the first time, when the second switch $Q_B$, the fourth switch $Q_D$, and the balancing switches $Q_{BAL1}$ and $Q_{BAL2}$ are turned on, the first switch $Q_A$ and the third switch $Q_C$ are turned off, and the flying capacitor $C_{FLY}$ and the bottom balancing capacitor $C_{FLY\_BAL\_B}$ are connected in parallel, the voltage $V_{CP}$ of the top plate node CP maintains the voltage $V_{CFLY}$ of the flying capacitor $C_{FLY}$, that is, the value ($V_{IN}/2$) obtained by dividing the input voltage $V_{IN}$ by 2, and the voltage $V_{SW}$ of the switching node SW rises to the voltage $V_{CFLY}$ of the flying capacitor $C_{FLY}$. This value $V_{CFLY}$ is approximated to the value ($V_{IN}/2$) obtained by dividing the input voltage $V_{IN}$ by 2, and thus these values are substantially the same. In addition, the voltage $V_{CN}$ of the bottom plate node CN maintains the ground level 0, and the current $I_L$ of the inductor L gradually rises.

Next, after the third time has elapsed, during the fourth time equal to the second time, when the third switch $Q_C$ and the fourth switch $Q_D$ are turned on, and the first switch $Q_A$, the second switch $Q_B$, and the balancing switches $Q_{BAL1}$ and $Q_{BAL2}$ are turned off, the voltage $V_{CP}$ of the top plate node CP maintains the voltage $V_{CFLY}$ of the flying capacitor $C_{FLY}$, that is, the value ($V_{IN}/2$) obtained by dividing the input voltage $V_{IN}$ by 2, and the voltage $V_{SW}$ of the switching node SW falls to the ground level 0, the voltage $V_{CN}$ of the bottom plate node CN maintains the ground level 0, and the current $I_L$ of the inductor L gradually falls.

For example, when the 3-level converter in accordance with one or more embodiments of the present disclosure operates at a duty ratio of approximately a configuration may be made such that 1) during a fifth time, the first switch $Q_A$, the third switch $Q_C$, and the balancing switches $Q_{BAL1}$ and $Q_{BAL2}$ are turned on, the second switch $Q_B$ and the fourth switch $Q_D$ are turned off, and thus the flying capacitor $C_{FLY}$ and the top balancing capacitor $C_{FLY\_BAL\_T}$ are connected in parallel; and 2) after the fifth time has elapsed, during a sixth time equal to the fifth time, the second switch $Q_B$, the fourth switch $Q_D$, and the balancing switches $Q_{BAL1}$, and $Q_{BAL2}$ are turned on, the first switch $Q_A$ and the third switch $Q_C$ are turned off, and thus the flying capacitor $C_{FLY}$ and the bottom balancing capacitor $C_{FLY\_BAL\_B}$ are connected in parallel.

Such an exemplary configuration according to one or more embodiments will be described in more detail with further reference to FIGS. 5 to 7.

Figure 5:
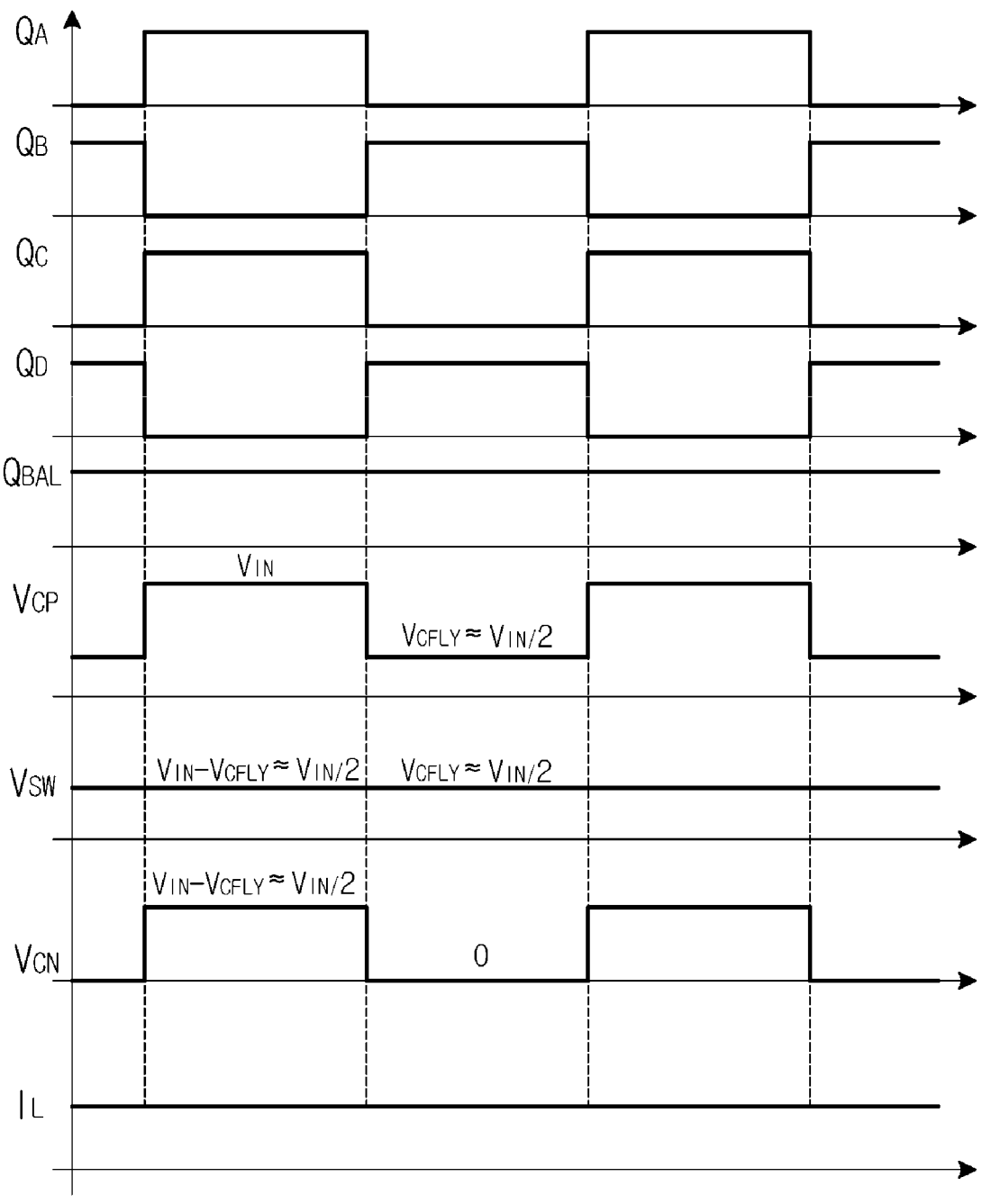
FIG. 5 is an exemplary operation timing diagram when the duty ratio is approximately 0.5 in one or more embodiments of the present disclosure.
Figure 6:
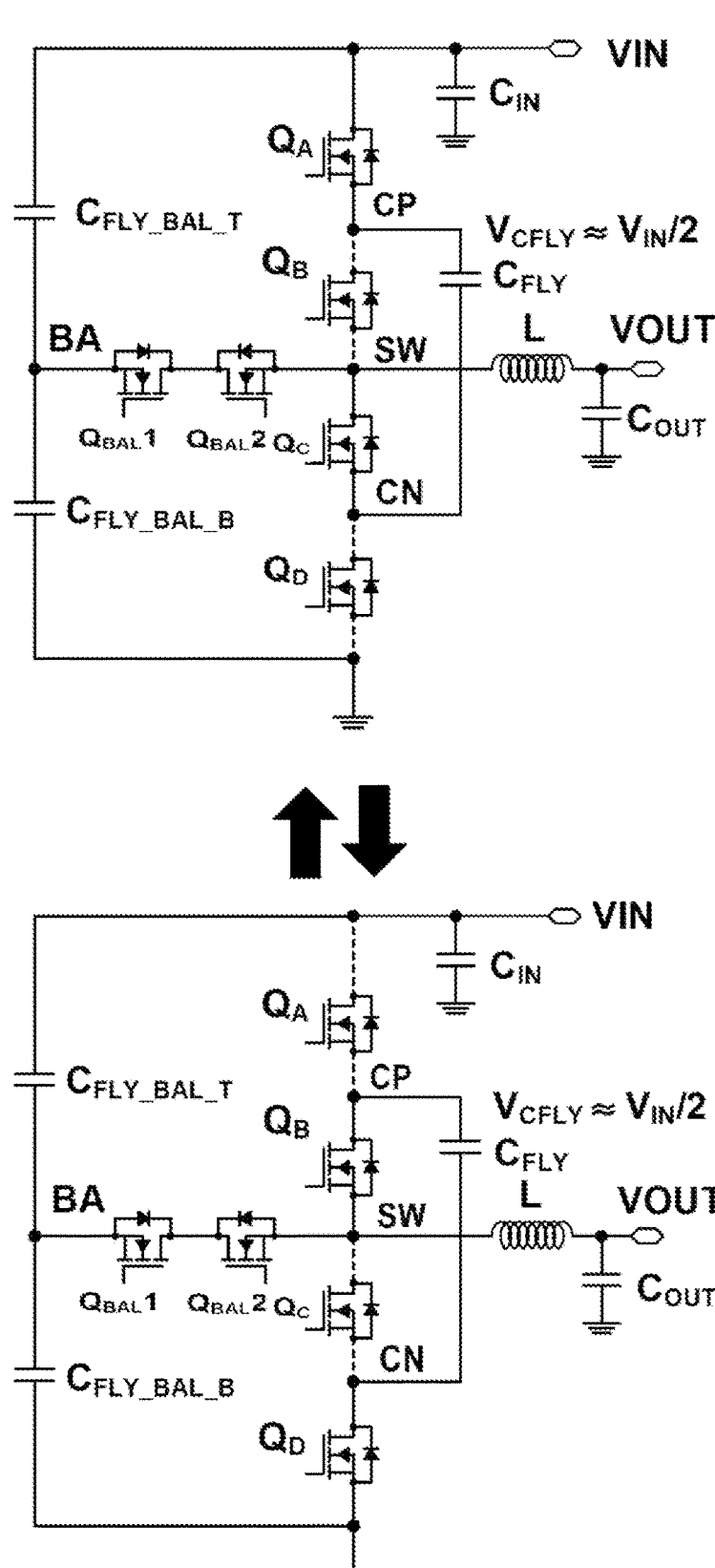
FIG. 6 is a diagram illustrating a circuit diagram of each operation mode when the duty ratio is approximately 0.5 in one or more embodiments of the present disclosure.
Figure 7:
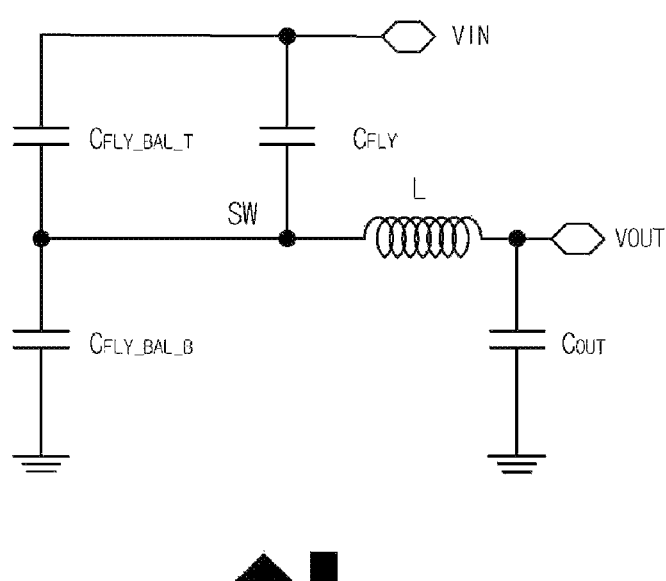
FIG. 7 is a diagram illustrating a simplified circuit diagram of each operation mode when the duty ratio is approximately 0.5 in one or more embodiments of the present disclosure.
Figure 7:
Figure 7:
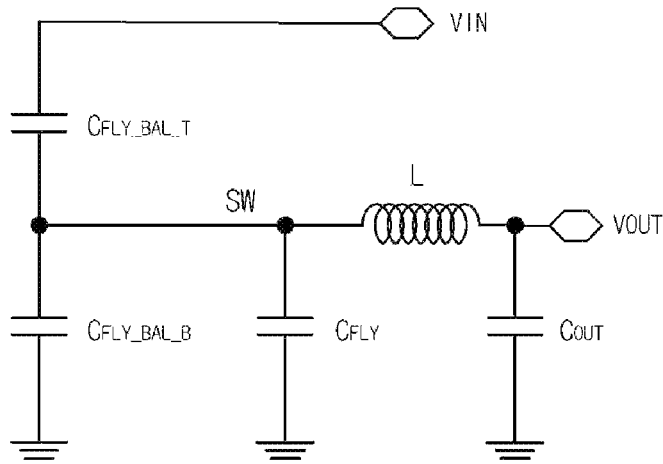

FIG. 5 is an exemplary operation timing diagram when the duty ratio is approximately 0.5 in one or more embodiments of the present disclosure, FIG. 6 is a diagram illustrating a circuit diagram of each operation mode when the duty ratio is approximately 0.5 in one or more embodiments of the present disclosure, and FIG. 7 is a diagram illustrating a simplified circuit diagram of each operation mode when the duty ratio is approximately 0.5 in one or more embodiments of the present disclosure.

Referring to FIGS. 5 to 7, first, during the fifth time, when the first switch $Q_A$, the third switch $Q_C$, and the balancing switches $Q_{BAL1}$ and $Q_{BAL2}$ are turned on and the second switch $Q_B$, the fourth switch $Q_D$ are turned off, and the flying capacitor $C_{FLY}$ and the top balancing capacitor $C_{FLY\_BAL\_T}$ are connected in parallel, the voltage $V_{CP}$ of the top plate node CP rises to the input voltage $V_{IN}$, the voltage $V_{SW}$ of the switching node SW becomes the value $(V_{IN}-V_{CFLY})$ obtained by subtracting the voltage $V_{CFLY}$ of the flying capacitor $C_{FL}Y$ from the input voltage $V_{IN}$, and this value $(V_{IN}-V_{CFLY})$ is a value approximated to the value $(V_{IN}/2)$ obtained by dividing the input voltage $V_{IN}$ by 2. In addition, the voltage $V_{CN}$ of the bottom plate node CN rises to the value $(V_{IN}-V_{CFLY})$ obtained by subtracting the voltage $V_{CFLY}$ of the flying capacitor $C_{FLY}$ from the input voltage $V_{IN}$, and this value $(V_{IN}-V_{CFLY})$ is approximated to the value $(V_{IN}/2)$ obtained by dividing the input voltage $V_{IN}$ by 2. The current $I_L$ of the inductor L maintains a constant value.

Next, after the fifth time has elapsed, during the sixth time equal to the fifth time, when the second switch $Q_B$, the fourth switch $Q_D$, and the balancing switches $Q_{BAL1}$, and $Q_{BAL2}$ are turned on, the first switch $Q_A$ and the third switch $Q_C$ are turned off, and the flying capacitor $C_{FLY}$ and the bottom balancing capacitor $C_{FLY\_BAL\_B}$ are connected in parallel, the voltage $V_{CP}$ of the top plate node CP falls to the voltage $V_{CFLY}$ of the flying capacitor $C_{FLY}$, and this value $V_{CFLY}$ is approximated to the value $(V_{IN}/2)$ obtained by dividing the input voltage $V_{IN}$ by 2. The voltage $V_{SW}$ of the switching node SW maintains the value $V_{CFLY}$ of the flying capacitor $C_{FLY}$, and this value $V_{CFLY}$ is approximated to the value $(V_{IN}/2)$ obtained by dividing the input voltage $V_{IN}$ by 2. The voltage $V_{CN}$ of the bottom plate node CN falls to the ground level 0, and the current $I_L$ of the inductor L maintains a constant value.

For example, when the 3-level converter in accordance with one or more embodiments of the present disclosure operates at a duty ratio greater than approximately 0.5, a configuration may be made such that 1) during a seventh time, the first switch $Q_A$, the third switch $Q_C$, and the balancing switches $Q_{BAL1}$ and $Q_{BAL2}$ are turned on, the second switch $Q_B$ and the fourth switch $Q_D$ are turned off, and thus the flying capacitor $C_{FLY}$ and the top balancing capacitor $C_{FLY\_BAL\_T}$ are connected in parallel; 2) after the seventh time has elapsed, during an eighth time following the seventh time, the first switch $Q_A$ and the second switch $Q_B$ are turned on, and the third switch $Q_C$, the fourth switch $Q_D$, and the balancing switches $Q_{BAL1}$ and $Q_{BAL2}$ are turned off; 3) after the eighth time has elapsed, during a ninth time equal to the seventh time, the second switch $Q_B$, the fourth switch $Q_D$, and the balancing switches $Q_{BAL1}$ and $Q_{BAL2}$ are turned on, the first switch $Q_A$ and the third switch $Q_C$ are turned off, and thus the flying capacitor $C_{FLY}$ and the bottom balancing capacitor $C_{FLY\_BAL\_B}$ are connected in parallel; and 4) after the ninth time has elapsed, during a tenth time equal to the eighth time, the first switch $Q_A$ and the second switch $Q_B$ are turned on, and the third switch $Q_C$, the fourth switch $Q_D$, and the balancing switches $Q_{BAL1}$ and $Q_{BAL2}$ are turned off.

Such an exemplary configuration according to one or more embodiments will be described in more detail with further reference to FIGS. 8 to 10.

Figure 8:
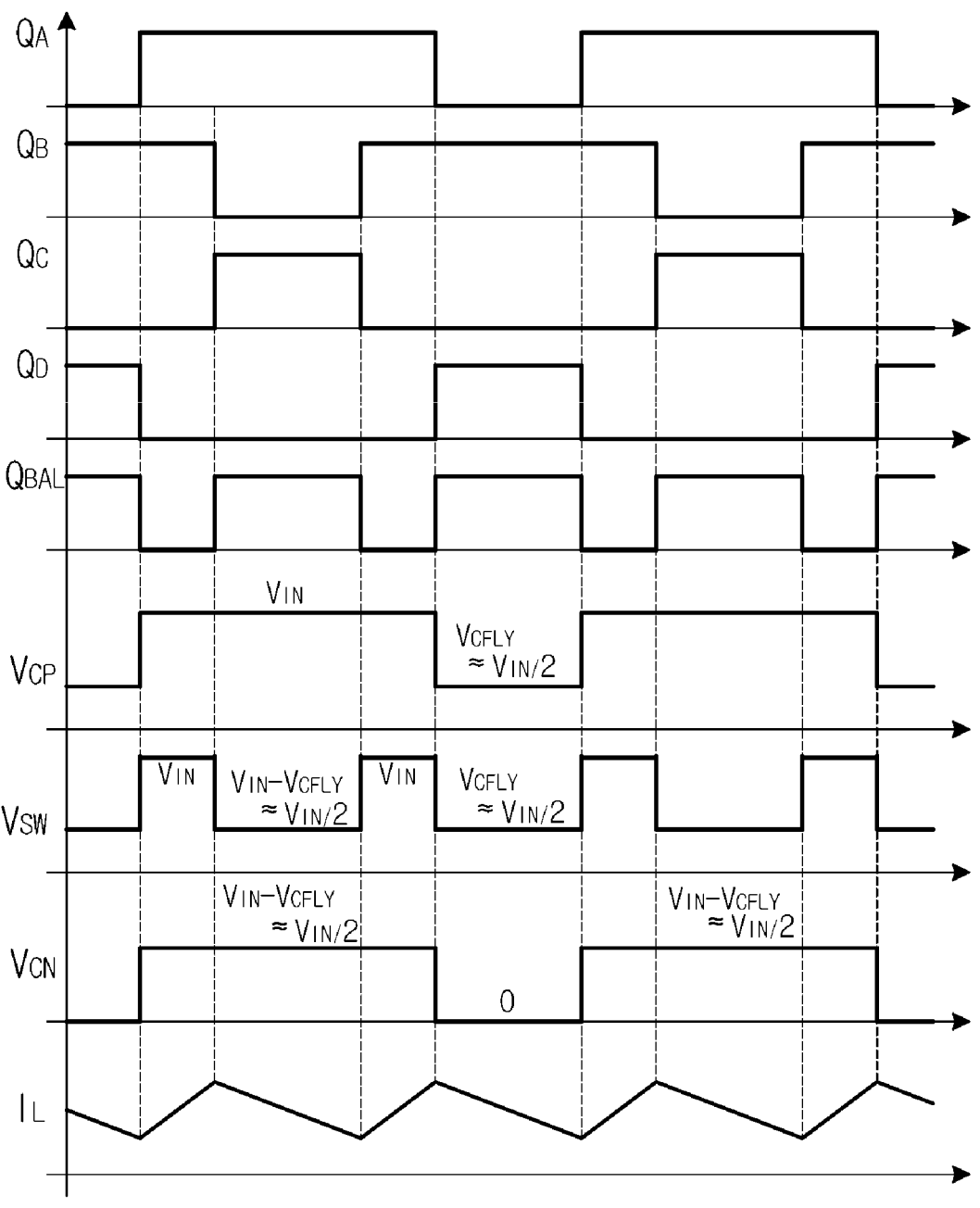
FIG. 8 is an exemplary operation timing diagram when the duty ratio D is greater than approximately 0.5 in one or more embodiments of the present disclosure.
Figure 9:
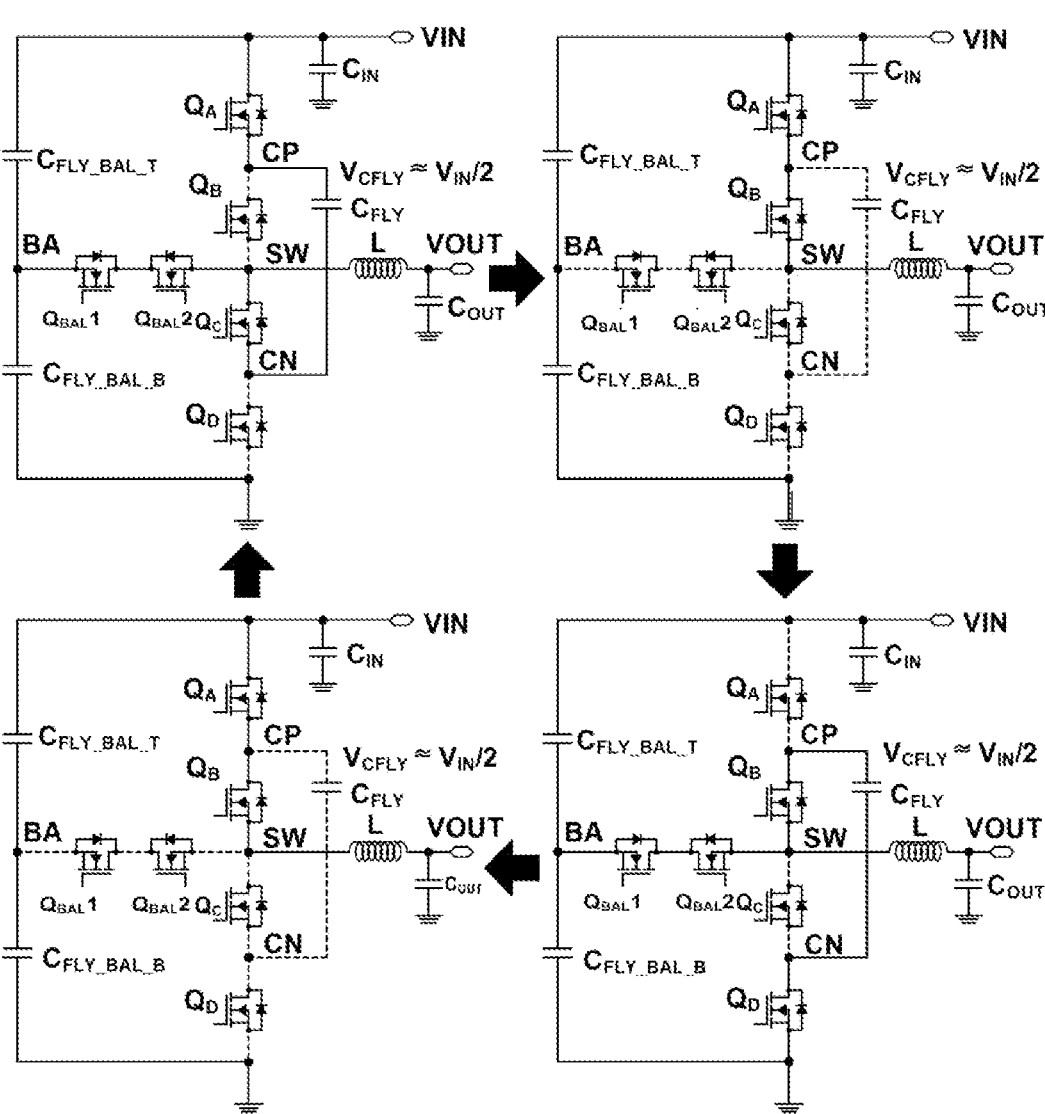
FIG. 9 is a diagram illustrating a circuit diagram of each operation mode when the duty ratio is greater than approximately 0.5 in one or more embodiments of the present disclosure.
Figure 10:
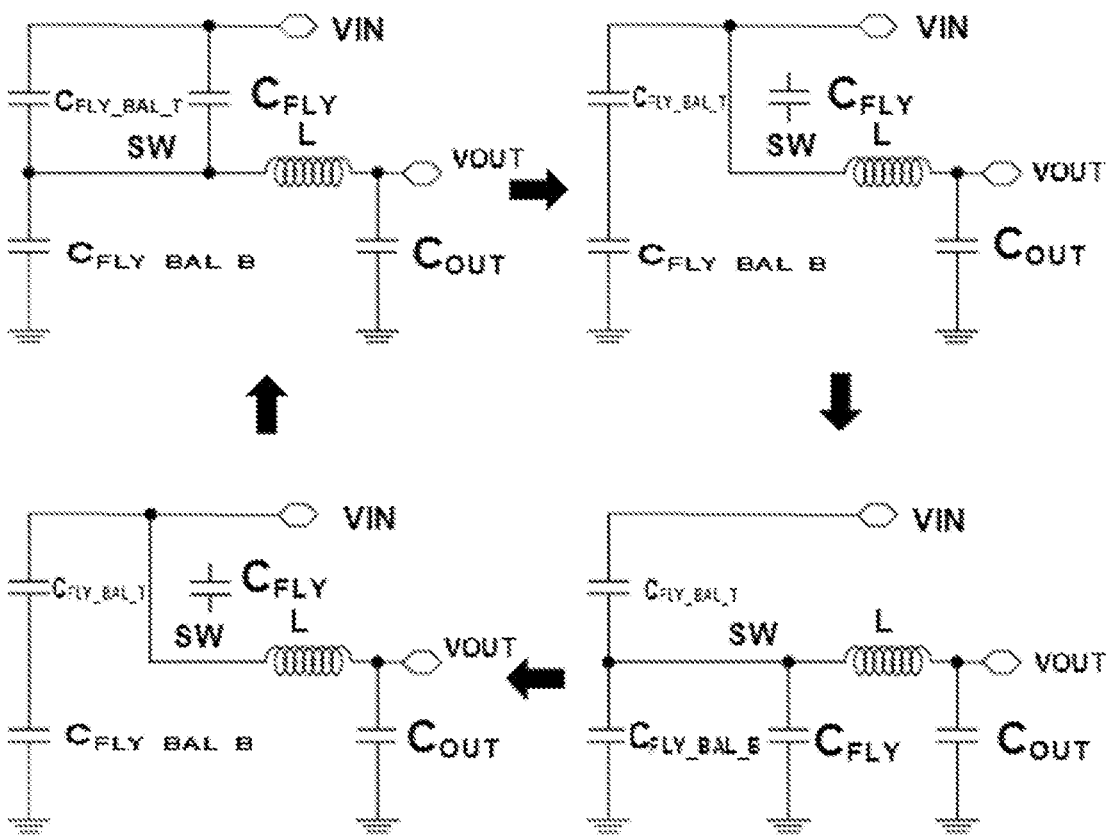
FIG. 10 is a diagram illustrating a simplified circuit diagram of each operation mode when the duty ratio is greater than approximately 0.5 in one or more embodiments of the present disclosure.

FIG. 8 is an exemplary operation timing diagram when the duty ratio D is greater than approximately 0.5 one or more embodiments of the present disclosure, FIG. 9 is a diagram illustrating a circuit diagram of each operation mode when the duty ratio is greater than approximately 0.5 in one or more embodiments of the present disclosure, and FIG. 10 is a diagram illustrating a simplified circuit diagram of each operation mode when the duty ratio is greater than approximately in one or more embodiments of the present disclosure.

Referring to FIGS. 8 to 10, first, during the seventh time, when the first switch $Q_A$, the third switch $Q_C$, and the balancing switches $Q_{BAL1}$, $Q_{BAL2}$ are turned on, the second switch $Q_B$ and the fourth switch $Q_D$ are turned off, and the flying capacitor $C_{FLY}$ and the top balancing capacitor $C_{FLY\_BAL\_T}$ are connected in parallel, the voltage $V_{CP}$ of the top plate node CP maintains the input voltage $V_{IN}$, the voltage $V_{SW}$ of the switching node SW falls to the value $(V_{IN}-V_{CFLY})$ obtained by subtracting the voltage $V_{CFLY}$ of the flying capacitor $C_{FLY}$ from the input voltage $V_{IN}$, and this value $(V_{IN}-V_{CFLY})$ is approximated to the value $(V_{IN}/2)$ obtained by dividing the input voltage $V_{IN}$ by 2; thus these values are substantially the same. In addition, the voltage $V_{CN}$ of the bottom plate node CN maintains the value $(V_{IN}-V_{CFLY})$ obtained by subtracting the voltage $V_{CFLY}$ of the flying capacitor $C_{FLY}$ from the input voltage $V_{IN}$, and this value $(V_{IN}-V_{CFLY})$ is approximated to the value $(V_{IN}/2)$ obtained by dividing the input voltage $V_{IN}$ by 2. The current $I_L$ of the inductor L gradually falls.

Next, after the seventh time has elapsed, during the eighth time following the seventh time, when the first switch $Q_A$ and the second switch $Q_B$ are turned on, and the third switch $Q_C$, the fourth switch $Q_D$, and the balancing switches $Q_{BAL1}$ and $Q_{BAL2}$ are turned off, the voltage $V_{CP}$ of the top plate node CP maintains the input voltage $V_{IN}$, the voltage $V_{SW}$ of the switching node SW rises to the input voltage $V_{IN}$, the voltage $V_{CN}$ of the bottom plate node CN maintains the value $(V_{IN}-V_{CFLY})$ obtained by subtracting the voltage $V_{CFLY}$ of the flying capacitor $C_{FLY}$ from the input voltage $V_{IN}$, and the current $I_L$ of the inductor L gradually rises.

Next, after the eighth time has elapsed, during the ninth time equal to the seventh time, when the second switch $Q_B$, the fourth switch $Q_D$, and the balancing switches $Q_{BAL1}$ and $Q_{BAL2}$ are turned on, the first switch $Q_A$ and the third switch $Q_C$ are turned off, and the flying capacitor $C_{FLY}$ and the bottom balancing capacitor $C_{FLY\_BAL\_B}$ are connected in parallel, the voltage $V_{CP}$ of the top plate node CP and the voltage $V_{SW}$ of the switching node SW fall to the voltage $V_{CFLY}$ of the flying capacitor $C_{FLY}$, and this value $V_{CFLY}$ is approximated to the value $(V_{IN}/2)$ obtained by dividing the input voltage $V_{IN}$ by 2. In addition, the voltage $V_{CN}$ of the bottom plate node CN falls to the ground level 0, and the current $I_L$ of the inductor L gradually falls.

Next, after the ninth time has elapsed, during the tenth time equal to the eighth time, when the first switch $Q_A$ and the second switch $Q_B$ are turned on, and the third switch $Q_C$, the fourth switch $Q_D$, and the balancing switches $Q_{BAL1}$ and $Q_{BAL2}$ are turned off, the voltage $V_{CP}$ of the top plate node CP and the voltage $V_{SW}$ of the switching node SW rise to the input voltage $V_{IN}$, the voltage $V_{CN}$ of the bottom plate node CN rises to the value $(V_{IN}-V_{CFLY})$ obtained by subtracting the voltage $V_{CFLY}$ of the flying capacitor $C_{FLY}$ from the input voltage $V_{IN}$, and this value $(V_{IN}-V_{CFLY})$ is approximated to the value $(V_{IN}/2)$ obtained by dividing the input voltage $V_{IN}$ by 2. The current $I_L$ of the inductor L gradually rises.

Figure 11:
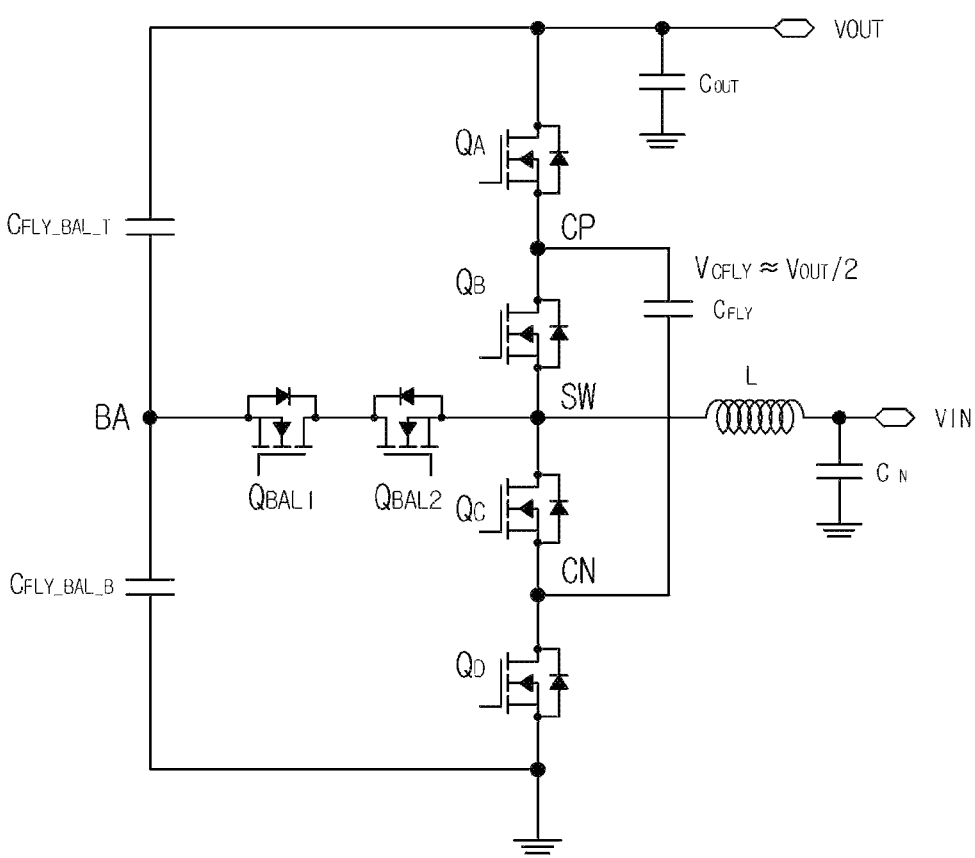
FIG. 11 is a diagram illustrating a 3-level converter in accordance with one or more embodiments of the present disclosure.

FIG. 11 is a diagram illustrating a 3-level converter in accordance with one or more embodiments of the present disclosure.

Referring to FIG. 11, one or more embodiments of the present disclosure provide a 3-level boost converter including a flying capacitor voltage balancing circuit, and is configured to include an inductor L, a first switch $Q_A$, a second switch $Q_B$, a third switch $Q_C$, a fourth switch $Q_D$, a flying capacitor $C_{FLY}$, balancing switches $Q_{BAL1}$ and $Q_{BAL2}$, a top balancing capacitor $C_{FLY\_BAL\_T}$, and a bottom balancing capacitor $C_{FLY\_BAL\_B}$.

In the following description, the first switch $Q_A$, the second switch $Q_B$, the third switch $Q_C$, the fourth switch $Q_D$, and the balancing switches $Q_{BAL1}$ and $Q_{BAL2}$ may be field effect transistors, but are not limited thereto.

The inductor connected in series between the switching node SW and the input terminal $V_{IN}$ to which the input voltage $V_{IN}$ is input.

The input capacitor $C_{IN}$ is connected between the input terminal $V_{IN}$ and a ground terminal.

The first switch $Q_A$ is connected between the output terminal VOUT from which an output voltage $V_{OUT}$ is output and a top plate node CP.

The second switch $Q_B$ is connected between the top plate node CP and the switching node SW.

The third switch $Q_C$ is connected between the switching node SW and a bottom plate node CN.

The fourth switch $Q_D$ is connected between the bottom plate node CN and a ground terminal.

The flying capacitor $C_{FLY}$ is connected between the top plate node CP and the bottom plate node CN.

The balancing switches $Q_{BAL1}$ and $Q_{BAL2}$ are connected between the switching node SW and a balancing node BA.

The top balancing capacitor $C_{FLY\_BAL\_T}$ is connected between the output terminal VOUT and the balancing node BA.

The bottom balancing capacitor $C_{FLY\_BAL\_B}$ is connected between the balancing node BA and a ground terminal.

For example, the flying capacitor $C_{FLY}$ may be configured to be connected in parallel with the top balancing capacitor $C_{FLY\_BAL\_T}$ for at least a first period of time during operation of the 3-level converter, and to be connected in parallel with the bottom balancing capacitor $C_{FLY\_BAL\_B}$ for at least a second period of time during operation of the 3-level converter.

For example, a configuration may be made such that the voltage $V_{CFLY}$ of the flying capacitor $C_{FLY}$ has a same value as the voltage of the top balancing capacitor $C_{FLY\_BAL\_T}$, and the voltage of the bottom balancing capacitor $C_{FLY\_BAL\_B}$.

For example, a configuration may be made such that the voltage $V_{CFLY}$ of the flying capacitor $C_{FLY}$, the voltage of the top balancing capacitor $C_{FLY\_BAL\_T}$, and the voltage of the bottom balancing capacitor $C_{FLY\_BAL\_B}$ maintain a value $(V_{OUT}/2)$ obtained by dividing the output voltage $V_{OUT}$ by 2.

Hereinafter, a non-limiting specific and exemplary operation configuration of the 3-level converter in accordance with one or more embodiments of the present disclosure will be described.

For example, when the 3-level converter in accordance with one or more embodiments of the present disclosure operates at a duty ratio D less than approximately 0.5, a configuration is made such that 1) during a first time, the first switch $Q_A$, the third switch $Q_C$, and the balancing switches $Q_{BAL1}$ and $Q_{BAL2}$ are turned on, the second switch $Q_B$ and the fourth switch $Q_D$ are turned off, and thus the flying capacitor $C_{FLY}$ and the top balancing capacitor $C_{FLY\_BAL\_T}$ are connected in parallel; 2) after the first time has elapsed, during a second time following the first time, the first switch $Q_A$ and the second switch $Q_B$ are turned on, and the third switch $Q_C$, the fourth switch $Q_D$, and the balancing switches $Q_{BAL1}$ and $Q_{BAL2}$ are turned off; 3) after the second time has elapsed, during a third time equal to the first time, the second switch $Q_B$, the fourth switch $Q_D$, and the balancing switches $Q_{BAL1}$ and $Q_{BAL2}$ are turned on, the first switch $Q_A$ and the third switch $Q_C$ are turned off, and thus the flying capacitor $C_{FLY}$ and the bottom balancing capacitor $C_{FLY\_BAL\_B}$ are connected in parallel; and 4) after the third time has elapsed, during a fourth time equal to the second time, the first switch $Q_A$ and the second switch $Q_B$ are turned on, and the third switch $Q_C$, the fourth switch $Q_D$, and the balancing switches $Q_{BAL1}$ and $Q_{BAL2}$ are turned off.

Such an exemplary configuration according to one or more embodiments will be described in more detail with further reference to FIGS. 12 to 14.

Figure 12:
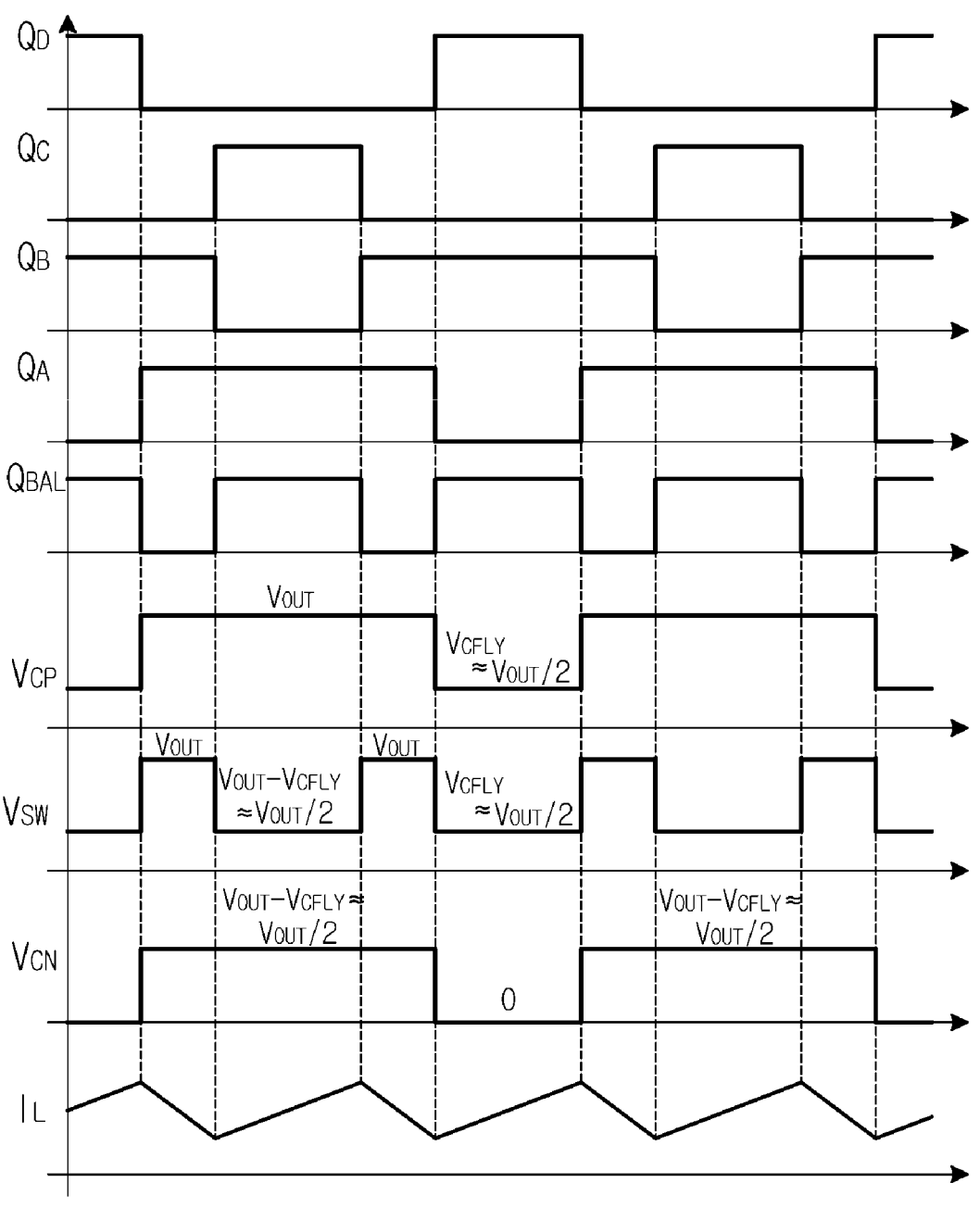
FIG. 12 is an exemplary operation timing diagram when a duty ratio D is less than approximately 0.5 in one or more embodiments of the present disclosure.
Figure 13:
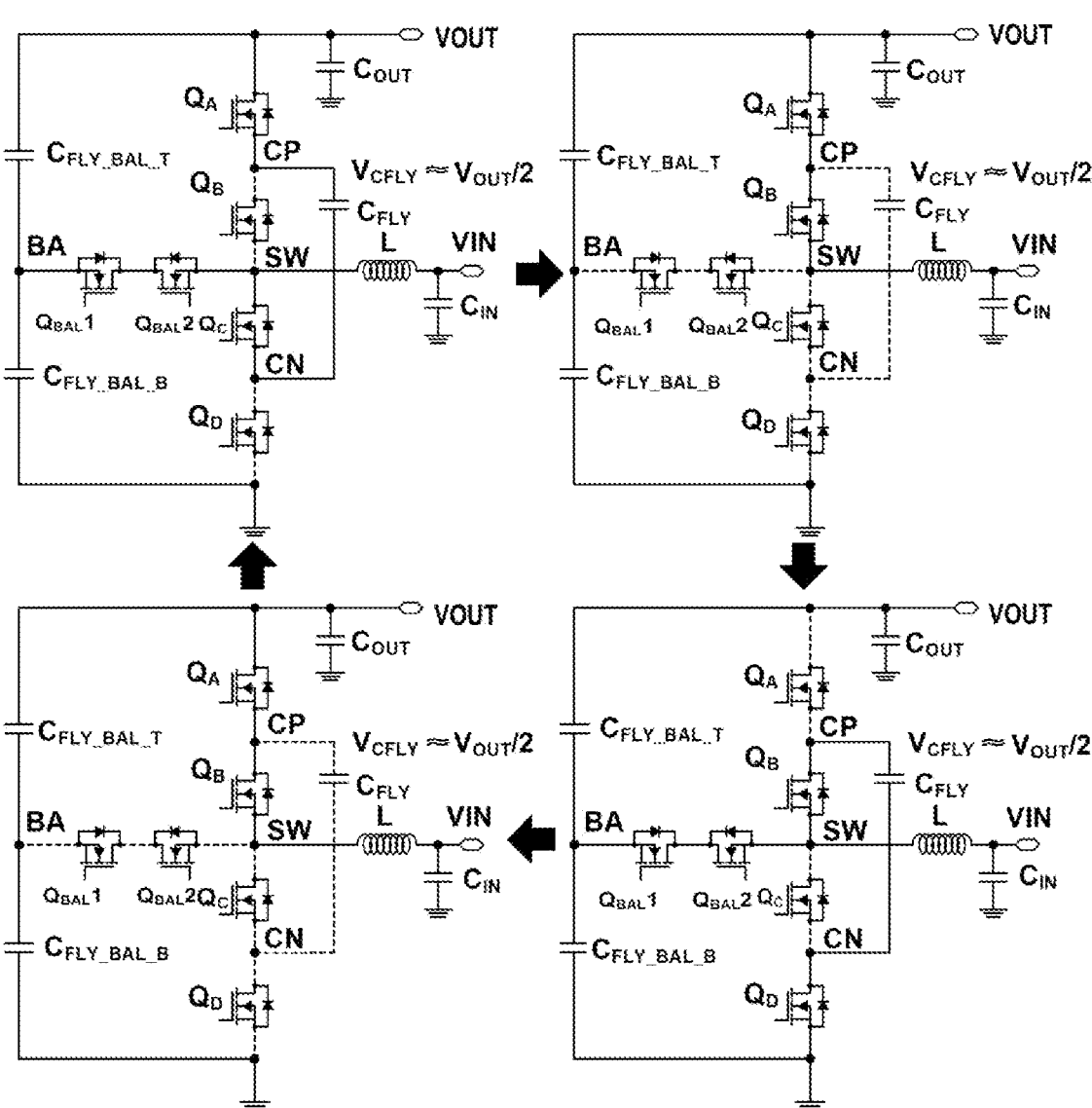
FIG. 13 is a diagram illustrating a circuit diagram of each operation mode when the duty ratio is less than approximately 0.5 in one or more embodiments of the present disclosure.
Figure 14:
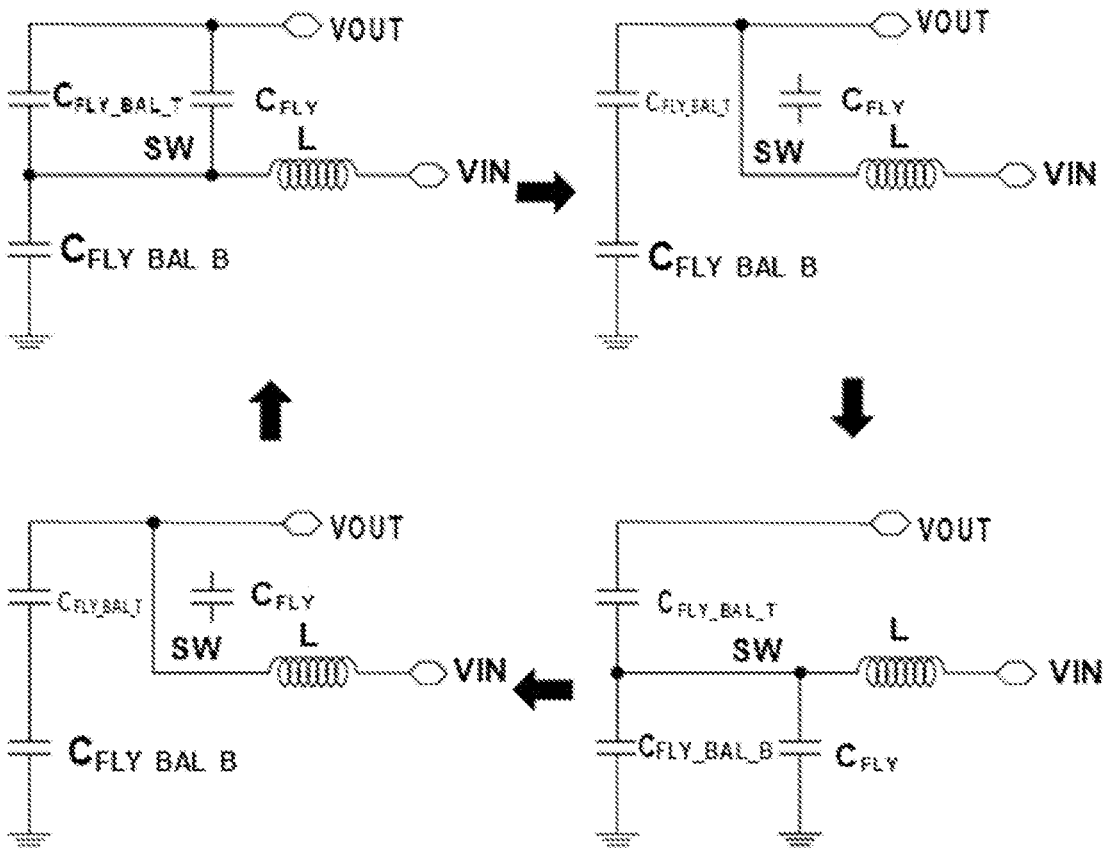
FIG. 14 is a diagram illustrating a simplified circuit diagram of each operation mode when the duty ratio is less than approximately 0.5 in one or more embodiments of the present disclosure.

FIG. 12 is an exemplary operation timing diagram when a duty ratio D is less than approximately 0.5 in one or more embodiments of the present disclosure, FIG. 13 is a diagram illustrating a circuit diagram of each operation mode when the duty ratio is less than approximately 0.5 in one or more embodiments of the present disclosure, and FIG. 14 is a diagram illustrating a simplified circuit diagram of each operation mode when the duty ratio is less than approximately 0.5 in one or more embodiments of the present disclosure.

Referring to FIGS. 12 to 14, first, during the first time, when the first switch $Q_A$, the third switch $Q_C$, and the balancing switches $Q_{BAL1}$, $Q_{BAL2}$ are turned on, the second switch $Q_B$ and the fourth switch $Q_D$ are turned off, and the flying capacitor $C_{FLY}$ and the top balancing capacitor $C_{FLY\_BAL\_T}$ are connected in parallel, the voltage $V_{CP}$ of the top plate node CP maintains the output voltage Vou T, the voltage $V_{SW}$ of the switching node SW falls to a value $(V_{OUT}-V_{CFLY})$ obtained by subtracting the voltage $V_{CFLY}$ of the flying capacitor $C_{FLY}$ from the output voltage $V_{OUT}$, and this value $(V_{OUT}-V_{CFLY})$ is approximated to the value $(V_{OUT}/2)$ obtained by dividing the output voltage $V_{OUT}$ by 2; thus these values are substantially the same. In addition, the voltage $V_{CN}$ of the bottom plate node CN maintains the value value $(V_{OUT}-V_{CFLY})$ obtained by subtracting the voltage $V_{CFLY}$ of the flying capacitor $C_{FLY}$ from the output voltage $V_{OUT}$, and the current $I_L$ of the inductor L gradually rises.

Next, after the first time has elapsed, during the second time following the first time, when the first switch $Q_A$ and the second switch $Q_B$ are turned on, and the third switch $Q_C$, the fourth switch $Q_D$, and the balancing switches $Q_{BAL1}$ and $Q_{BAL2}$ are turned off, the voltage $V_{CP}$ of the top plate node CP maintains the output voltage $V_{OUT}$, the voltage $V_{SW}$ of the switching node SW rises to the output voltage Vou T, the voltage $V_{CN}$ of the bottom plate node CN maintains the value $(V_{OUT}-V_{CFLY})$ obtained by subtracting the voltage $V_{CFLY}$ of the flying capacitor $C_{FLY}$ from the output voltage $V_{OUT}$, and the current $I_L$ of the inductor L gradually falls.

Next, after the second time has elapsed, during the third time equal to the first time, when the second switch $Q_B$, the fourth switch $Q_D$, and the balancing switches $Q_{BAL1}$ and $Q_{BAL2}$ are turned on, the first switch $Q_A$ and the third switch Q c are turned off, and the flying capacitor $C_{FLY}$ and the bottom balancing capacitor $C_{FLY\_BAL\_B}$ are connected in parallel, the voltage $V_{CP}$ of the top plate node CP and the voltage $V_{SW}$ of the switching node SW fall to the voltage $V_{CFLY}$ of the flying capacitor $C_{FLY}$, and this value $V_{CFLY}$ is approximated to the value $(V_{OUT}/2)$ obtained by dividing the output voltage $V_{OUT}$ by 2; thus these values are substantially the same. In addition, the voltage $V_{CN}$ of the bottom plate node CN falls to the ground level 0, and the current $I_L$ of the inductor L gradually rises.

Next, after the third time has elapsed, during the fourth time equal to the second time, when the first switch $Q_A$ and the second switch $Q_B$ are turned on, and the third switch $Q_C$, fourth switch $Q_D$ and the balancing switches $Q_{BAL1}$ and $Q_{BAL2}$ are turned off, the voltage $V_{CP}$ of the top plate node CP and the voltage $V_{SW}$ of the switching node SW rise to the output voltage $V_{OUT}$, the voltage $V_{CN}$ of the bottom plate node CN rises to the value $(V_{OUT}-V_{CFLY})$ obtained by subtracting the voltage $V_{CFLY}$ of the flying capacitor $C_{FLY}$ from the output voltage $V_{OUT}$, and this value $(V_{OUT}-V_{CFLY})$ is approximated to the value $(V_{OUT}/2)$ obtained by dividing the output voltage $V_{OUT}$ by 2; thus these values are substantially the same. In addition, the current $I_L$ of the inductor L gradually falls.

For example, when the 3-level converter in accordance with one or more embodiments of the present disclosure operates at a duty ratio of approximately a configuration may be made such that 1) during a fifth time, the first switch $Q_A$, the third switch $Q_C$, and the balancing switches $Q_{BAL1}$ and $Q_{BAL2}$ are turned on, and the second switch $Q_B$ and the fourth switch $Q_D$ are turned off, and thus the flying capacitor $C_{FLY}$ and the top balancing capacitor $C_{FLY\_BAL\_T}$ are connected in parallel; and 2) after the fifth time has elapsed, during a sixth time equal to the fifth time, the second switch $Q_B$, the fourth switch $Q_D$, and the balancing switches $Q_{BAL1}$ and $Q_{BAL2}$ are turned on, the first switch $Q_A$ and the third switch $Q_C$ are turned off, and thus the flying capacitor $C_{FLY}$ and the bottom balancing capacitor $C_{FLY\_BAL\_B}$ are connected in parallel.

Such an exemplary configuration according to one or more embodiments will be described in more detail with further reference to FIGS. 15 to 17.

Figure 15:
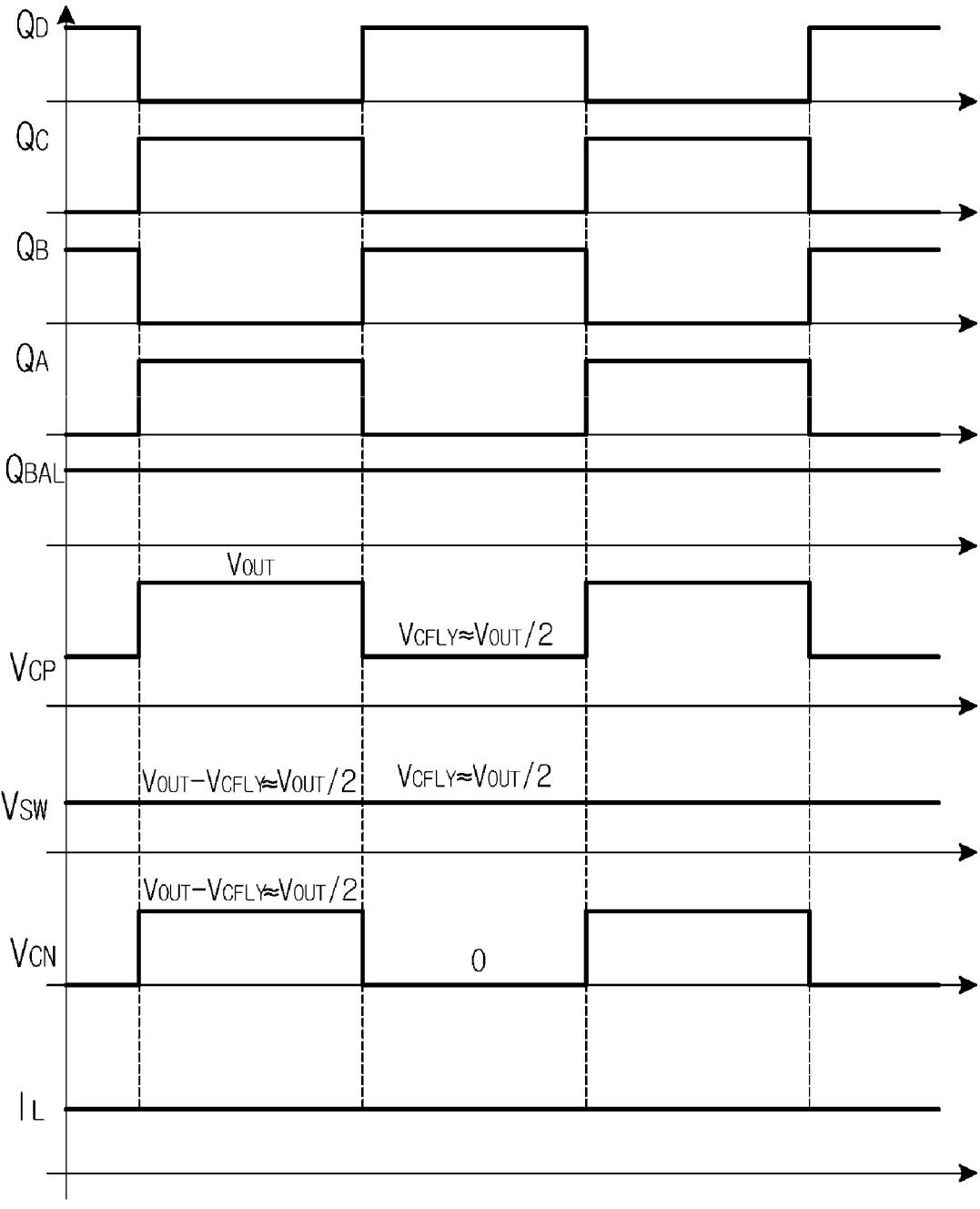
FIG. 15 is an exemplary operation timing diagram when the duty ratio is approximately 0.5 in one or more embodiments of the present disclosure.
Figure 16:
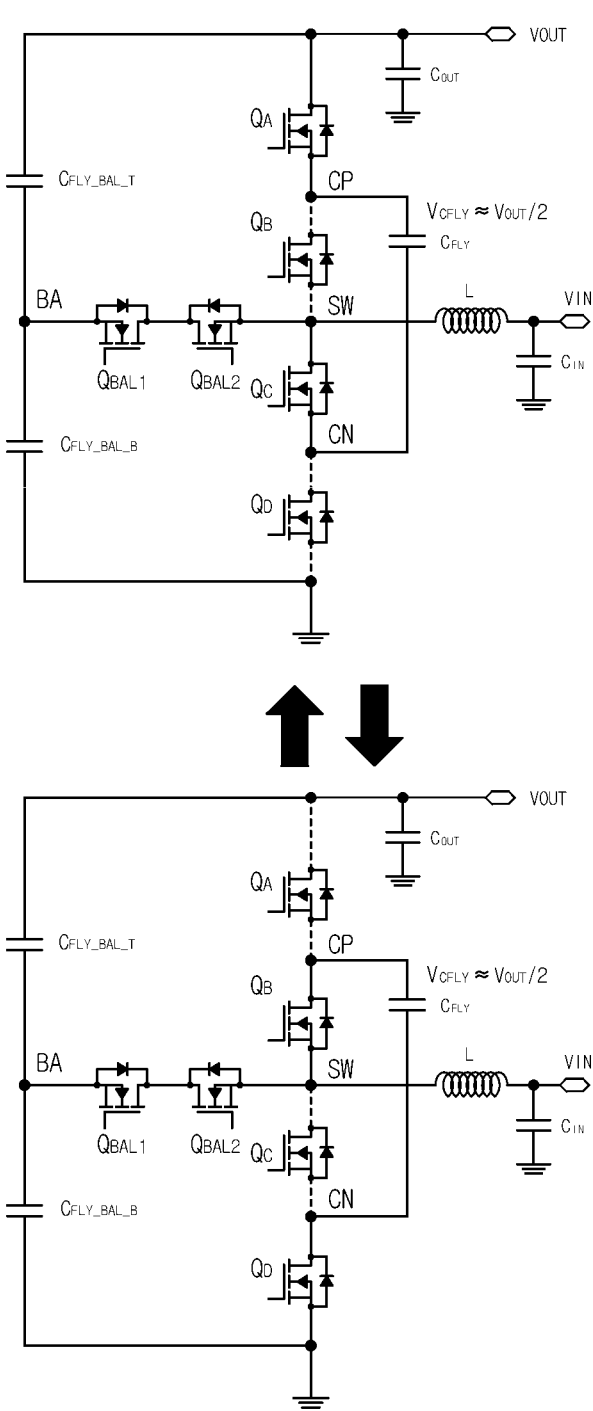
FIG. 16 is a diagram illustrating a circuit diagram of each operation mode when the duty ratio is approximately 0.5 in one or more embodiments of the present disclosure.
Figure 17:
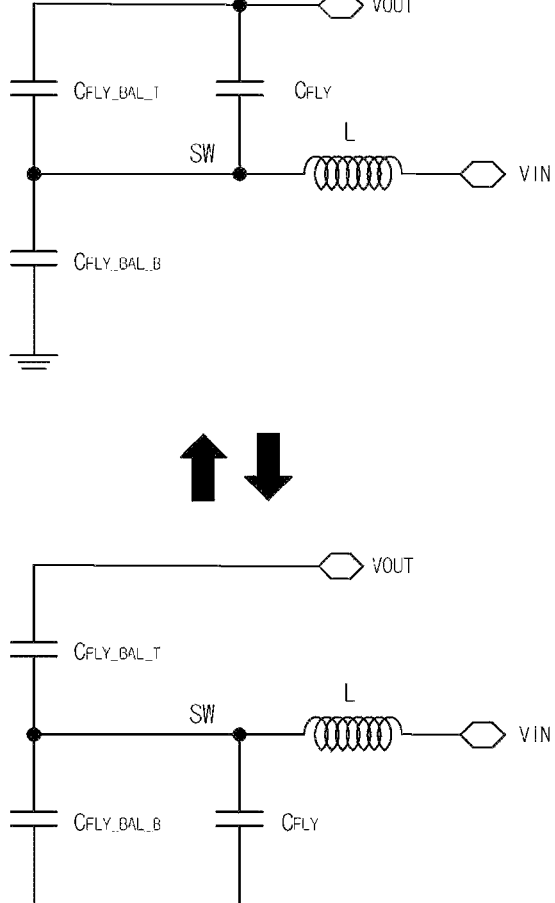
FIG. 17 is a diagram illustrating a simplified circuit diagram of each operation mode when the duty ratio is approximately 0.5 in one or more embodiments of the present disclosure.

FIG. 15 is an exemplary operation timing diagram when the duty ratio is approximately 0.5 in one or more embodiments of the present disclosure, FIG. 16 is a diagram illustrating a circuit diagram of each operation mode when the duty ratio is approximately 0.5 in one or more embodiments of the present disclosure, and FIG. 17 is a diagram illustrating a simplified circuit diagram of each operation mode when the duty ratio is approximately 0.5 in one or more embodiments of the present disclosure.

Referring to FIGS. 15 to 17, first, during the fifth time, when the first switch $Q_A$, the third switch $Q_C$, and the balancing switches $Q_{BAL1}$ and $Q_{BAL2}$ are turned on, the second switch $Q_B$ and the fourth switch $Q_D$ are turned off, and the flying capacitor $C_{FLY}$ and the top balancing capacitor $C_{FLY\_BAL\_T}$ are connected in parallel, the voltage $V_{CP}$ of the top plate node CP rises to the output voltage $V_{OUT}$, the voltage $V_{SW}$ of the switching node SW becomes the value $(V_{OUT}-V_{CFLY})$ obtained by subtracting the voltage $V_{CFLY}$ of the flying capacitor $C_{FL}Y$ from the output voltage $V_{OUT}$, and this value $(V_{OUT}-V_{CFLY})$ is approximated to the value $(V_{OUT}/2)$ obtained by dividing the output voltage $V_{OUT}$ by 2. The voltage $V_{CN}$ of the bottom plate node CN rises the value $(V_{OUT}-V_{CFLY})$ obtained by subtracting the voltage $V_{CFLY}$ of the flying capacitor $C_{FLY}$ from the output voltage $V_{OUT}$, and this value $(V_{OUT}-V_{CFLY})$ is approximated to the value $(V_{OUT}/2)$ obtained by dividing the output voltage $V_{OUT}$ by 2. The current $I_L$ of the inductor L maintains a constant value.

Next, after the fifth time has elapsed, during the sixth time equal to the fifth time, when the second switch $Q_B$, the fourth switch $Q_D$, and the balancing switches $Q_{BAL1}$, and $Q_{BAL2}$ are turned on, the first switch $Q_A$ and the third switch $Q_C$ are turned off, and the flying capacitor $C_{FLY}$ and the bottom balancing capacitor $C_{FLY\_BAL\_B}$ are connected in parallel, the voltage $V_{CP}$ of the top plate node CP falls to the voltage $V_{CFLY}$ of the flying capacitor $C_{FLY}$, and this value $V_{CFLY}$ is approximated to the value $(V_{OUT}/2)$ obtained by dividing the output voltage $V_{OUT}$ by 2. The voltage $V_{SW}$ of the switching node SW becomes the value $V_{CFLY}$ of the flying capacitor $C_{FLY}$, and this value $V_{CFLY}$ is approximated to the value $(V_{OUT}/2)$ obtained by dividing the output voltage $V_{OUT}$ by 2. The voltage $V_{CN}$ of the bottom plate node CN falls to the ground level 0. The current $I_L$ of the inductor L maintains a constant value.

For example, when the 3-level converter in accordance with one or more embodiments of the present disclosure operates at a duty ratio greater than approximately 0.5, a configuration may be made such that 1) during a seventh time, the first switch $Q_A$, the third switch $Q_C$, and the balancing switches $Q_{BAL1}$ and $Q_{BAL2}$ are turned on, the second switch $Q_B$ and the fourth switch $Q_D$ are turned off, and thus the flying capacitor $C_{FLY}$ and the top balancing capacitor $C_{FLY\_BAL\_T}$ are connected in parallel; 2) after the seventh time has elapsed, during an eighth time following the seventh time, the third switch $Q_C$ and the fourth switch $Q_D$ are turned on, and the first switch $Q_A$, the second switch $Q_B$, and the balancing switches $Q_{BAL1}$ and $Q_{BAL2}$ are turned off; 3) after the eighth time has elapsed, during a ninth time equal to the seventh time, the second switch $Q_B$, the fourth switch $Q_D$, and the balancing switches $Q_{BAL1}$ and $Q_{BAL2}$ are turned on, the first switch $Q_A$ and the third switch $Q_C$ are turned off, and thus the flying capacitor $C_{FLY}$ and the bottom balancing capacitor $C_{FLY\_BAL\_B}$ are connected in parallel; and 4) after the ninth time has elapsed, during a tenth time equal to the eighth time, the third switch $Q_C$ and the fourth switch $Q_D$ are turned on, and the first switch $Q_A$, the second switch $Q_B$, and the balancing switches $Q_{BAL1}$ and $Q_{BAL2}$ are turned off.

Such an exemplary configuration according to one or more embodiments will be described in more detail with further reference to FIGS. 18 to 20.

Figure 18:
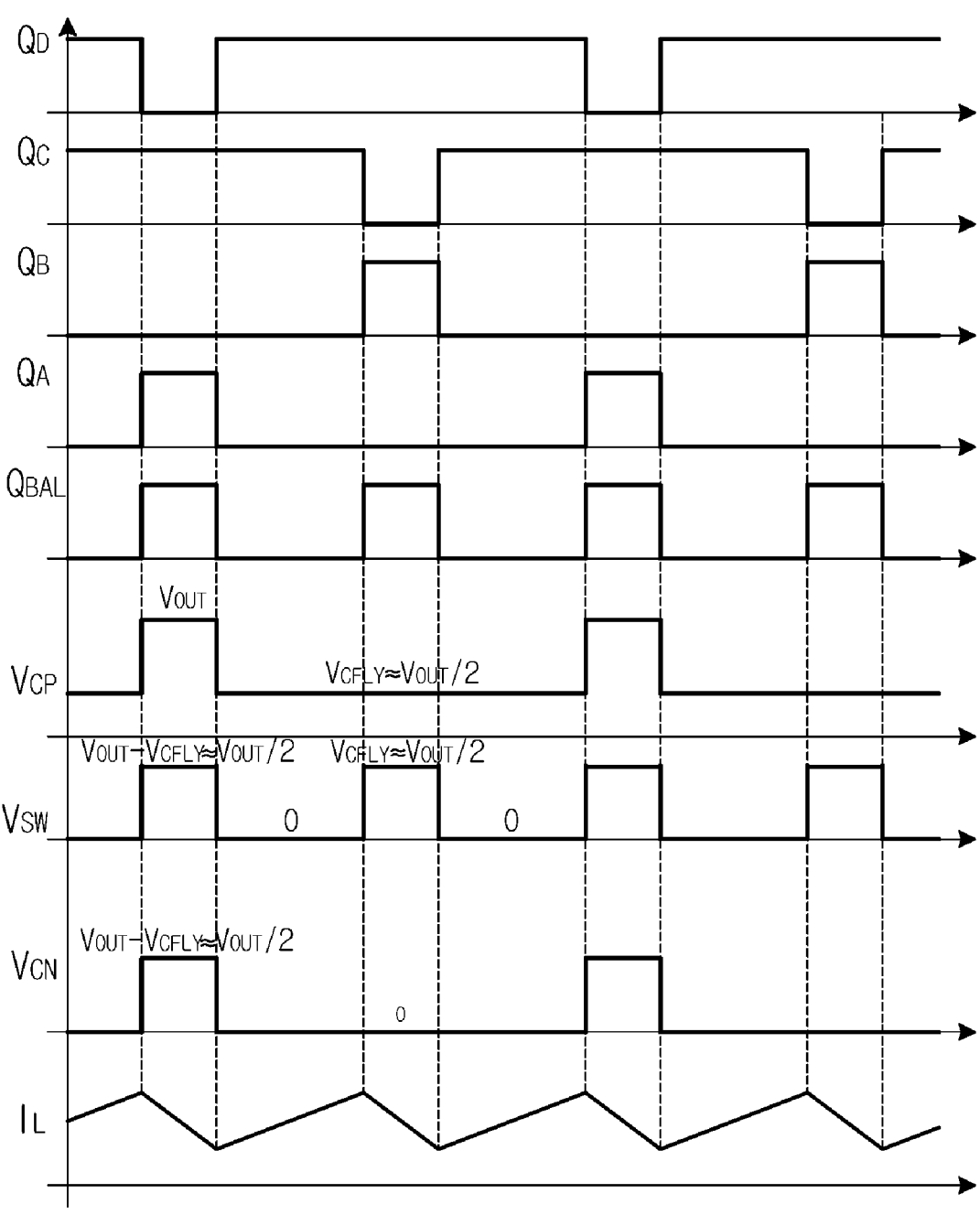
FIG. 18 is an exemplary operation timing diagram when the duty ratio D is greater than approximately 0.5 in one or more embodiments of the present disclosure.
Figure 19:
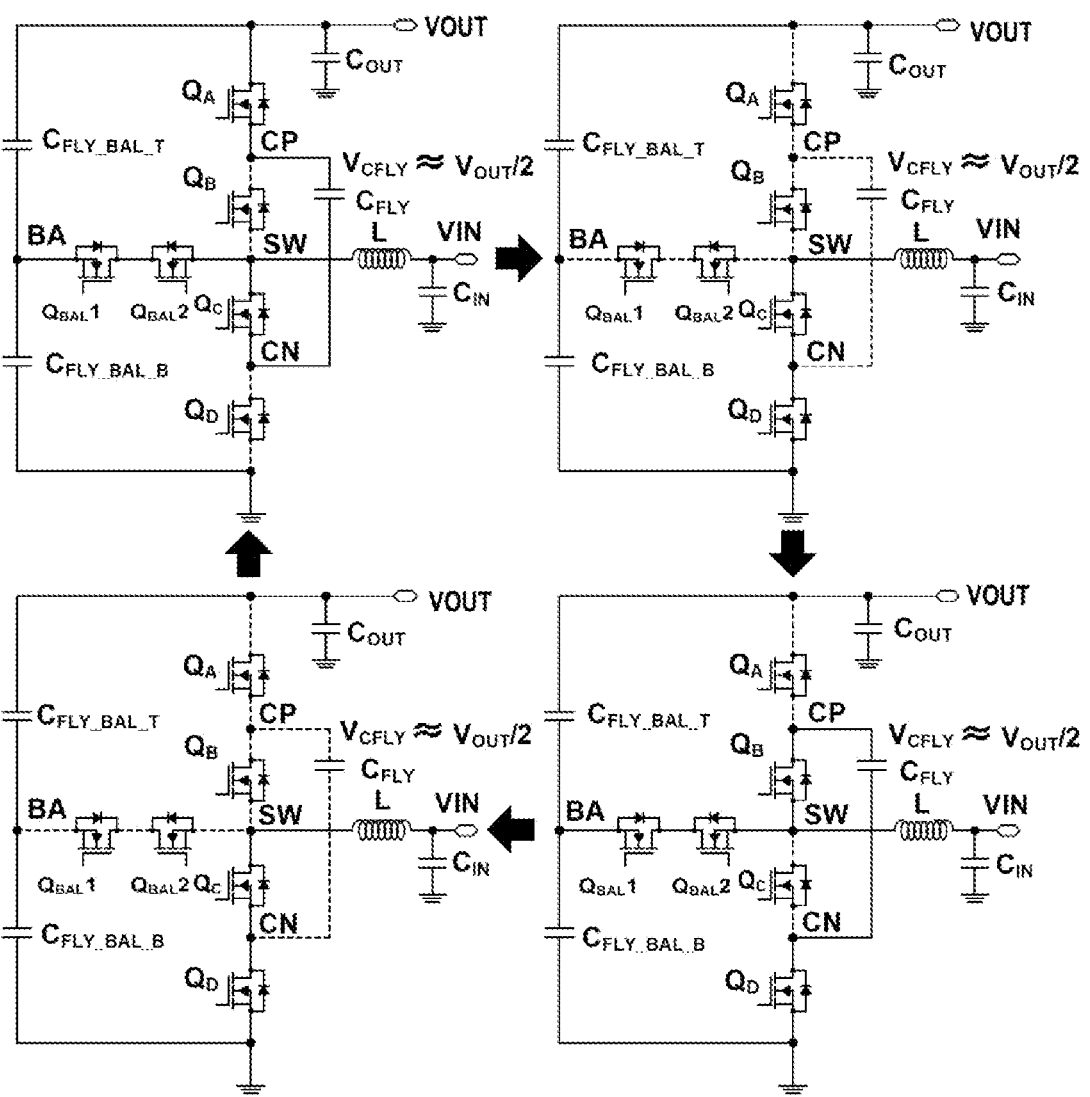
FIG. 19 is a diagram illustrating a circuit diagram of each operation mode when the duty ratio is greater than approximately 0.5 in one or more embodiments of the present disclosure.
Figure 20:
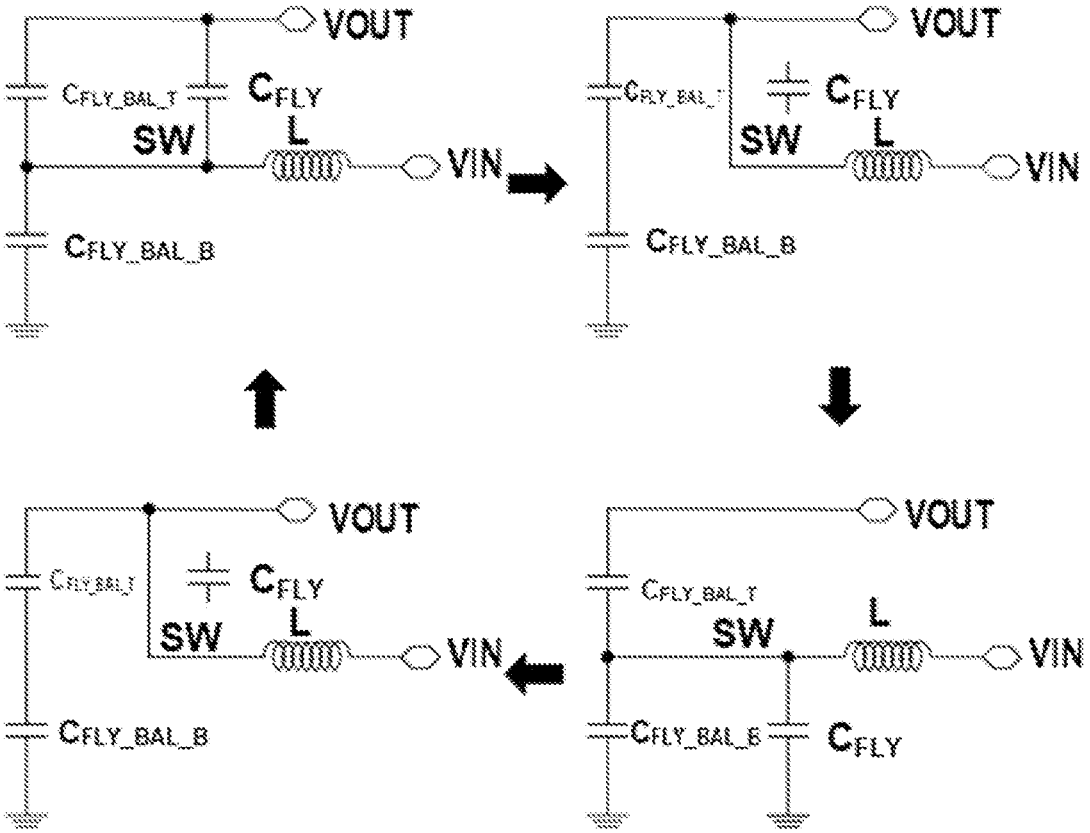
FIG. 20 is a diagram illustrating a simplified circuit diagram of each operation mode when the duty ratio is greater than approximately 0.5 in one or more embodiments of the present disclosure.

FIG. 18 is an exemplary operation timing diagram when the duty ratio D is greater than approximately 0.5 in one or more embodiments of the present disclosure, FIG. 19 is a diagram illustrating a circuit diagram of each operation mode when the duty ratio is greater than approximately 0.5 in one or more embodiments of the present disclosure, and FIG. 20 is a diagram illustrating a simplified circuit diagram of each operation mode when the duty ratio is greater than approximately in one or more embodiments of the present disclosure.

Referring to FIGS. 18 to 20, first, during the seventh time, when the first switch $Q_A$, the third switch $Q_C$, and the balancing switches $Q_{BAL1}$, $Q_{BAL2}$ are turned on, the second switch $Q_B$ and the fourth switch $Q_D$ are turned off, and the flying capacitor $C_{FLY}$ and the top balancing capacitor $C_{FLY\_BAL\_T}$ are connected in parallel, the voltage $V_{CP}$ of the top plate node CP rises to the output voltage $V_{OUT}$, the voltage $V_{SW}$ of the switching node SW and the voltage $V_{CN}$ of the bottom plate node CN rise to a value $(V_{OUT}-V_{CFLY})$ obtained by subtracting the voltage $V_{CFLY}$ of the flying capacitor $C_{FLY}$ from the output voltage $V_{OUT}$, and this value $(V_{OUT}-V_{CFLY})$ is approximated to the value $(V_{OUT}/2)$ obtained by dividing the output voltage $V_{OUT}$ by 2; thus these values become substantially equal. In addition, the current $I_L$ of the inductor L gradually falls.

Next, after the seventh time has elapsed, during the eighth time following the seventh time, when the third switch $Q_C$ and the fourth switch $Q_D$ are turned on, and the first switch $Q_A$, the second switch $Q_B$, and the balancing switches $Q_{BAL1}$ and $Q_{BAL2}$ are turned off, the voltage $V_{CP}$ of the top plate node CP falls to the voltage $V_{CFLY}$ of the flying capacitor $C_{FLY}$, and this value $V_{CFLY}$ is approximated to the value ($V_{OUT}/2$) obtained by dividing the output voltage $V_{OUT}$ by 2; thus these values become substantially equal. In addition, the voltage $V_{SW}$ of the switching node SW and the voltage $V_{CN}$ of the bottom plate node CN fall to the ground level 0, and the current $I_L$ of the inductor L gradually rises.

Next, after the eighth time has elapsed, during the ninth time equal to the seventh time, when the second switch $Q_B$, the fourth switch $Q_D$, and the balancing switches $Q_{BAL1}$ and $Q_{BAL2}$ are turned on, the first switch $Q_A$ and the third switch $Q_C$ are turned off, and the flying capacitor $C_{FLY}$ and the bottom balancing capacitor $C_{FLY\_BAL\_B}$ are connected in parallel, the voltage $V_{CP}$ of the top plate node CP maintains the voltage $V_{CFLY}$ of the flying capacitor $C_{FLY}$, and this value $V_{CFLY}$ is approximated to the value ($V_{OUT}/2$) obtained by dividing the output voltage $V_{OUT}$ by 2; thus these values become substantially equal. In addition, the voltage $V_{SW}$ of the switching node SW rises to the voltage $V_{CFLY}$ of the flying capacitor $C_{FLY}$, and this value $V_{CFLY}$ is approximated to the value ($V_{OUT}/2$) obtained by dividing the output voltage $V_{OUT}$ by 2; thus these values become substantially equal. In addition, the voltage $V_{CN}$ of the bottom plate node CN maintains the ground level 0, and the current $I_L$ of the inductor L gradually falls.

Next, after the ninth time has elapsed, during the tenth time equal to the eighth time, when the third switch $Q_C$ and the fourth switch $Q_D$ are turned on, and the first switch $Q_A$, the second switch $Q_B$, and the balancing switches $Q_{BAL1}$ and $Q_{BAL2}$ are turned off, the voltage $V_{CP}$ of the top plate node CP maintains the voltage $V_{CFLY}$ of the flying capacitor $C_{FLY}$, and this value $V_{CFLY}$ is approximated to the value ($V_{OUT}/2$) obtained by dividing the output voltage $V_{OUT}$ by 2; thus these values become substantially equal. In addition, the voltage $V_{SW}$ of the switching node SW falls to the ground level 0, the voltage $V_{CN}$ of the bottom plate node CN maintains the ground level 0, and the current $I_L$ of the inductor L gradually rises.

As described in detail above, according to the present disclosure, efficiency can be improved by allowing the voltages across switches to be equally applied and reducing the inductor current ripple by implementing the flying capacitor voltage balancing with a simple circuit in the 3-level converter.

In addition, there is an effect of achieving the flying capacitor voltage balancing at high speed.

Although the 3-level converter with the flying capacitor voltage balancing circuit has been described with reference to the specific embodiments, it is not limited thereto. Therefore, it will be readily understood by those skilled in the art that various modifications and changes can be made thereto without departing from the spirit and scope of the present disclosure defined by the appended claims.

What is claimed is:

1. A 3-level converter, comprising:
an inductor connected in series between a switching node and an output terminal from which an output voltage is output;
an output capacitor connected between the output terminal and a ground terminal;
a first switch connected between an input terminal to which an input voltage is input and a top plate node;
a second switch connected between the top plate node and the switching node;
a third switch connected between the switching node and a bottom plate node;
a fourth switch connected between the bottom plate node and a ground terminal;

a flying capacitor connected between the top plate node and the bottom plate node;
balancing switches connected between the switching node and a balancing node;
a top balancing capacitor connected between the input terminal and the balancing node; and
a bottom balancing capacitor connected between the balancing node and a ground terminal.

2. The 3-level converter of claim 1, wherein
the flying capacitor is connected in parallel with the top balancing capacitor for at least a first period of time during operation of the 3-level converter, and is connected in parallel with the bottom balancing capacitor for at least a second period of time during operation of the 3-level converter.

3. The 3-level converter of claim 2, wherein
a voltage of the flying capacitor has a same value as a voltage of the top balancing capacitor and a voltage of the bottom balancing capacitor.

4. The 3-level converter of claim 3, wherein
the voltage of the flying capacitor, the voltage of the top balancing capacitor, and the voltage of the bottom balancing capacitor maintain a value obtained by dividing the input voltage by 2.

5. The 3-level converter of claim 1, wherein
when a duty ratio D is less than approximately 0.5,
during a first time, the first switch, the third switch, and the balancing switches are turned on, the second switch and the fourth switch are turned off, and the flying capacitor and the top balancing capacitor are connected in parallel,
after the first time has elapsed, during a second time following the first time, the third switch and the fourth switch are turned on, and the first switch, the second switch, and the balancing switches are turned off,
after the second time has elapsed, during a third time equal to the first time, the second switch, the fourth switch, and the balancing switches are turned on, the first switch and the third switch are turned off, and the flying capacitor and the bottom balancing capacitor are connected in parallel, and
after the third time has elapsed, during a fourth time equal to the second time, the third switch and the fourth switch are turned on, and the first switch, the second switch, and the balancing switches are turned off.

6. The 3-level converter of claim 1, wherein
when a duty ratio D is approximately 0.5,
during a fifth time, the first switch, the third switch, and the balancing switches are turned on, the second switch and the fourth switch are turned off, and the flying capacitor and the top balancing capacitor are connected in parallel, and
after the fifth time has elapsed, during a sixth time equal to the fifth time, the second switch, the fourth switch, and the balancing switches are turned on, the first switch and the third switch are turned off, and the flying capacitor and the bottom balancing capacitor are connected in parallel.

7. The 3-level converter of claim 1, wherein
when a duty ratio D is greater than approximately 0.5,
during a seventh time, the first switch, the third switch, and the balancing switches are turned on, the second switch and the fourth switch are turned off, and the flying capacitor and the top balancing capacitor are connected in parallel,
after the seventh time has elapsed, during an eighth time following the seventh time, the first switch and the second switch are turned on, and the third switch, the fourth switch, and the balancing switches are turned off, after the eighth time has elapsed, during a ninth time equal to the seventh time, the second switch, the fourth switch, and the balancing switches are turned on, the first switch and the third switch are turned off, and the flying capacitor and the bottom balancing capacitor are connected in parallel, and after the ninth time has elapsed, during a tenth time equal to the eighth time, the first switch and the second switch are turned on, and the third switch, the fourth switch, and the balancing switches are turned off.

\* \* \* \* \*